US009208515B2

(12) United States Patent
Lamoureux et al.

(10) Patent No.: US 9,208,515 B2
(45) Date of Patent: Dec. 8, 2015

(54) SYSTEM AND METHOD FOR CONCEPT DEVELOPMENT

(75) Inventors: Steven Howard Lamoureux, Boston, MA (US); Mahesh Pai, Wilmington, MA (US); Waleed Mohammed Ali Al-Atraqchi, Acton, MA (US); Kamal Moussa Malek, Weston, MA (US); Angel Ismael Municio, Woburn, MA (US); Jeremy David Blanchard, Milton, MA (US)

(73) Assignee: AFFINNOVA, INC., Waltham, MA (US)

( * ) Notice: Subject to any disclaimer, the term of this patent is extended or adjusted under 35 U.S.C. 154(b) by 0 days.

(21) Appl. No.: 13/415,739

(22) Filed: Mar. 8, 2012

(65) Prior Publication Data

US 2012/0232851 A1    Sep. 13, 2012

Related U.S. Application Data

(60) Provisional application No. 61/450,531, filed on Mar. 8, 2011, provisional application No. 61/450,546, filed on Mar. 8, 2011, provisional application No. 61/450,559, filed on Mar. 8, 2011, provisional application No. 61/506,503, filed on Jul. 11, 2011.

(51) Int. Cl.
*G06Q 30/00* (2012.01)
*G06F 17/25* (2006.01)
(Continued)

(52) U.S. Cl.
CPC .......... *G06Q 30/0276* (2013.01); *G06F 3/0482* (2013.01); *G06F 17/211* (2013.01); *G06F 17/25* (2013.01); *G06Q 30/02* (2013.01); *G06Q 50/04* (2013.01)

(58) Field of Classification Search
CPC .... G06Q 30/0276; G06F 17/212; G06F 17/25
USPC ........................................................ 715/247
See application file for complete search history.

(56) References Cited

U.S. PATENT DOCUMENTS

| 4,115,761 A | 9/1978 | Ueda et al. |
|---|---|---|
| 4,603,232 A | 7/1986 | Kurland et al. |

(Continued)

FOREIGN PATENT DOCUMENTS

| EP | 1285368 | | 2/2003 |
|---|---|---|---|
| JP | 2001331627 | A | 11/2001 |

(Continued)

OTHER PUBLICATIONS

Wempen, F., "Microsoft® PowerPoint® 2010 Bible" (May 10, 2010), Wiley Publishing, Inc., pp. 1-780.*

(Continued)

*Primary Examiner* — Brian W Wathen
(74) *Attorney, Agent, or Firm* — Hanley, Flight & Zimmerman, LLC

(57) ABSTRACT

A computer implemented method, system, and computer program product include one or more processors providing a framework for building a visual representation of a product concept, the visual representation including one or more of a textual component and a graphical component; one or more processors receiving a designation of an element within at least one of the textual component and the graphical components as a dynamic element; one or more processors associating the dynamic element with a variant list including a plurality of element variants; one or more processors receiving a selection of a subset of the plurality of element variants from the variant list; and one or more processors generating a first instantiation of the visual representation including a combination of the subset of the plurality of element variants as the dynamic element.

19 Claims, 25 Drawing Sheets

(51) Int. Cl.
  *G06F 17/21* (2006.01)
  *G06Q 30/02* (2012.01)
  *G06F 3/0482* (2013.01)
  *G06Q 50/04* (2012.01)

(56) References Cited

U.S. PATENT DOCUMENTS

| | | | |
|---|---|---|---|
| 4,935,877 A | 6/1990 | Koza | |
| 5,041,972 A | 8/1991 | Frost | |
| 5,090,909 A | 2/1992 | Keller et al. | |
| 5,124,911 A | 6/1992 | Sack | |
| 5,222,192 A | 6/1993 | Shaefer | |
| 5,255,345 A | 10/1993 | Shaefer | |
| 5,375,195 A | 12/1994 | Johnston | |
| 5,400,248 A | 3/1995 | Chisholm | |
| 5,559,729 A | 9/1996 | Abe | |
| 5,608,424 A | 3/1997 | Takahashi et al. | |
| 5,651,098 A | 7/1997 | Inoue et al. | |
| 5,654,098 A | 8/1997 | Aono et al. | |
| 5,687,369 A | 11/1997 | Li | |
| 5,704,017 A | 12/1997 | Heckerman et al. | |
| 5,724,567 A | 3/1998 | Rose et al. | |
| 5,884,282 A | 3/1999 | Robinson | |
| 5,893,098 A | 4/1999 | Peters et al. | |
| 5,913,204 A | 6/1999 | Kelly | |
| 5,918,014 A | 6/1999 | Robinson | |
| 5,930,780 A | 7/1999 | Hughes et al. | |
| 5,995,951 A | 11/1999 | Ferguson | |
| 6,029,139 A | 2/2000 | Cunningham et al. | |
| 6,041,311 A | 3/2000 | Chislenko et al. | |
| 6,070,145 A | 5/2000 | Pinsley et al. | |
| 6,078,740 A | 6/2000 | DeTreville | |
| 6,088,510 A | 7/2000 | Sims | |
| 6,093,026 A | 7/2000 | Walker et al. | |
| 6,098,048 A | 8/2000 | Dashefsky et al. | |
| 6,125,351 A | 9/2000 | Kauffman | |
| 6,155,839 A | 12/2000 | Clark et al. | |
| 6,167,382 A | 12/2000 | Sparks et al. | |
| 6,167,445 A | 12/2000 | Gai et al. | |
| 6,175,833 B1 | 1/2001 | West et al. | |
| 6,202,058 B1 | 3/2001 | Rose et al. | |
| 6,223,191 B1 * | 4/2001 | Truelson | 715/205 |
| 6,233,564 B1 | 5/2001 | Schulze, Jr. | |
| 6,236,977 B1 | 5/2001 | Verba et al. | |
| 6,249,714 B1 | 6/2001 | Hocaoglu et al. | |
| 6,281,651 B1 | 8/2001 | Haanpaa et al. | |
| 6,304,861 B1 | 10/2001 | Ferguson | |
| 6,380,928 B1 | 4/2002 | Todd | |
| 6,385,620 B1 | 5/2002 | Kurzius et al. | |
| 6,438,579 B1 | 8/2002 | Hosken | |
| 6,460,036 B1 | 10/2002 | Herz | |
| 6,477,504 B1 | 11/2002 | Hamlin et al. | |
| 6,546,380 B1 | 4/2003 | Lautzenheiser et al. | |
| 6,574,585 B2 | 6/2003 | Caruso et al. | |
| 6,629,097 B1 | 9/2003 | Keith | |
| 6,636,862 B2 | 10/2003 | Lundahl et al. | |
| 6,741,967 B1 | 5/2004 | Wu et al. | |
| 6,754,635 B1 | 6/2004 | Hamlin et al. | |
| 6,778,807 B1 | 8/2004 | Martino et al. | |
| 6,826,541 B1 | 11/2004 | Johnston et al. | |
| 6,839,680 B1 | 1/2005 | Liu et al. | |
| 6,859,782 B2 | 2/2005 | Harshaw | |
| 6,873,965 B2 | 3/2005 | Feldman et al. | |
| 6,901,424 B1 | 5/2005 | Winn | |
| 6,915,269 B1 | 7/2005 | Shapiro et al. | |
| 6,934,748 B1 | 8/2005 | Louviere et al. | |
| 6,944,514 B1 | 9/2005 | Matheson | |
| 6,993,495 B2 | 1/2006 | Smith, Jr. et al. | |
| 6,999,987 B1 | 2/2006 | Billingsley et al. | |
| 7,016,882 B2 | 3/2006 | Afeyan et al. | |
| 7,054,828 B2 | 5/2006 | Heching et al. | |
| 7,058,590 B2 | 6/2006 | Shan | |
| 7,177,851 B2 | 2/2007 | Afeyan et al. | |
| 7,269,570 B2 | 9/2007 | Krotki | |
| 7,302,475 B2 | 11/2007 | Gold et al. | |
| 7,308,418 B2 | 12/2007 | Malek et al. | |
| 7,337,127 B1 | 2/2008 | Smith et al. | |
| 7,398,223 B2 | 7/2008 | Kahlert et al. | |
| 7,610,249 B2 | 10/2009 | Afeyan et al. | |
| 7,711,580 B1 | 5/2010 | Hudson | |
| 7,730,002 B2 | 6/2010 | Afeyan et al. | |
| 7,877,346 B2 | 1/2011 | Karty | |
| 7,912,898 B2 | 3/2011 | Gold et al. | |
| 7,921,360 B1 | 4/2011 | Sundermeyer et al. | |
| 8,082,519 B2 | 12/2011 | Oron et al. | |
| 8,103,540 B2 | 1/2012 | Gross | |
| 8,150,795 B2 | 4/2012 | Montgomery, Jr. et al. | |
| 8,234,152 B2 | 7/2012 | Jepson et al. | |
| 8,868,446 B2 | 10/2014 | Lamoureux et al. | |
| 2002/0002482 A1 | 1/2002 | Thomas | |
| 2002/0016731 A1 | 2/2002 | Kupersmit | |
| 2002/0052774 A1 | 5/2002 | Parker et al. | |
| 2002/0077881 A1 | 6/2002 | Krotki | |
| 2002/0128898 A1 | 9/2002 | Smith, Jr. et al. | |
| 2002/0133502 A1 | 9/2002 | Rosenthal et al. | |
| 2002/0161664 A1 | 10/2002 | Shaya et al. | |
| 2003/0088458 A1 | 5/2003 | Afeyan et al. | |
| 2003/0233337 A1 | 12/2003 | Yanase et al. | |
| 2004/0123247 A1 | 6/2004 | Wachen et al. | |
| 2004/0181461 A1 | 9/2004 | Raiyani et al. | |
| 2004/0199923 A1 | 10/2004 | Russek | |
| 2004/0204957 A1 | 10/2004 | Afeyan et al. | |
| 2004/0205653 A1 | 10/2004 | Hadfield et al. | |
| 2004/0210471 A1 | 10/2004 | Luby et al. | |
| 2004/0236625 A1 | 11/2004 | Kearon | |
| 2004/0267604 A1 | 12/2004 | Gross | |
| 2005/0075919 A1 | 4/2005 | Kim | |
| 2005/0131716 A1 | 6/2005 | Hanan et al. | |
| 2005/0197988 A1 | 9/2005 | Bublitz | |
| 2005/0203807 A1 | 9/2005 | Bezos et al. | |
| 2005/0261953 A1 | 11/2005 | Malek et al. | |
| 2006/0004621 A1 | 1/2006 | Malek et al. | |
| 2006/0080268 A1 | 4/2006 | Afeyan et al. | |
| 2006/0149616 A1 | 7/2006 | Hildick-Smith | |
| 2006/0259344 A1 | 11/2006 | Patel et al. | |
| 2007/0067212 A1 | 3/2007 | Bonabeau | |
| 2007/0067850 A1 | 3/2007 | Jung et al. | |
| 2007/0218834 A1 | 9/2007 | Yogev et al. | |
| 2007/0222793 A1 | 9/2007 | Olhofer et al. | |
| 2007/0226073 A1 | 9/2007 | Wang | |
| 2007/0282666 A1 | 12/2007 | Afeyan et al. | |
| 2008/0077901 A1 | 3/2008 | Arsintescu | |
| 2008/0091510 A1 | 4/2008 | Crandall et al. | |
| 2008/0091656 A1 | 4/2008 | Charnock et al. | |
| 2008/0147483 A1 | 6/2008 | Ji | |
| 2008/0243637 A1 | 10/2008 | Chan et al. | |
| 2008/0288494 A1 | 11/2008 | Brogger et al. | |
| 2008/0306895 A1 | 12/2008 | Karty | |
| 2009/0150213 A1 | 6/2009 | Cyr et al. | |
| 2009/0231356 A1 | 9/2009 | Barnes | |
| 2009/0254971 A1 | 10/2009 | Herz et al. | |
| 2009/0276695 A1 * | 11/2009 | Hodges et al. | 715/249 |
| 2009/0282482 A1 | 11/2009 | Huston | |
| 2009/0292987 A1 * | 11/2009 | Sorenson | 715/255 |
| 2009/0307055 A1 | 12/2009 | Karty | |
| 2010/0010893 A1 | 1/2010 | Rajaraman et al. | |
| 2010/0082441 A1 | 4/2010 | Doemling et al. | |
| 2010/0125541 A1 | 5/2010 | Wendel et al. | |
| 2010/0241513 A1 * | 9/2010 | Prasad et al. | 705/14.52 |
| 2010/0313119 A1 | 12/2010 | Baldwin et al. | |
| 2010/0318916 A1 | 12/2010 | Wilkins | |
| 2011/0087679 A1 | 4/2011 | Rosato et al. | |
| 2011/0125591 A1 | 5/2011 | Evans | |
| 2011/0261049 A1 | 10/2011 | Cardno et al. | |
| 2011/0302494 A1 | 12/2011 | Callery et al. | |
| 2012/0116843 A1 | 5/2012 | Karty | |
| 2012/0209723 A1 * | 8/2012 | Satow et al. | 705/14.72 |
| 2012/0229500 A1 | 9/2012 | Lamoureux et al. | |
| 2012/0232850 A1 | 9/2012 | Lamoureux et al. | |
| 2012/0232852 A1 | 9/2012 | Lamoureux et al. | |
| 2012/0233037 A1 | 9/2012 | Lamoureux et al. | |
| 2013/0060662 A1 | 3/2013 | Carlson et al. | |

(56) References Cited

U.S. PATENT DOCUMENTS

| | | | |
|---|---|---|---|
| 2014/0195901 A1 | 7/2014 | Deblois et al. | |
| 2014/0279203 A1 | 9/2014 | Malek et al. | |
| 2014/0344013 A1 | 11/2014 | Karty et al. | |

FOREIGN PATENT DOCUMENTS

| | | | |
|---|---|---|---|
| JP | 2002015097 A | 1/2002 | |
| JP | 2002092291 A | 3/2002 | |
| JP | 2002117204 A | 4/2002 | |
| JP | 2002215870 A | 8/2002 | |
| JP | 2003030537 A | 1/2003 | |
| KR | 20100082650 | 7/2010 | |
| WO | 0002138 A1 | 1/2000 | |
| WO | 0171535 | 9/2001 | |
| WO | 02057986 A2 | 7/2002 | |
| WO | 2005116896 A2 | 12/2005 | |
| WO | 2006012122 A2 | 2/2006 | |
| WO | 2008022341 | 2/2008 | |
| WO | 2010055017 A2 | 5/2010 | |
| WO | 2014143729 | 9/2014 | |
| WO | 2014152010 | 9/2014 | |

OTHER PUBLICATIONS

Russell, J.T.; Lane, W.R., "Kleppner's Advertising Procedure", 13th Edition (1996), Prentice-Hall, Inc., pp. 482-551.*
International Search Report and Written Opinion, mailed Jul. 11, 2012, received in international patent application No. PCT/US2012/028364, (10 pages).
International Search Report and Written Opinion, mailed Jul. 6, 2012, received in international patent application No. PCT/US2012/028375, (11 pages).
International Search Report and Written Opinion, mailed Jul. 11, 2012, received in international patent application No. PCT/US2012/028369, (11 pages).
International Search Report and Written Opinion, mailed Jul. 6, 2012, received in international patent application No. PCT/US2012/028373, (11 pages).
International Search Report and Written Opinion, mailed Jul. 9, 2012, received in international patent application No. PCT/US2012/028376, (11 pages).
"Chapter 5: Sampling", Sage Publishing, http://www.sagepub.com/upm-data/24480_Ch5.pdf, (Date Unknown), pp. 148-189.
"Chapter 7: Sampling in Market Research", http://web.archive.org/web/20050313042847/http://www.fao.org/docrep/w3241e/w3241e08.htm from Mar. 13, 2005, (accessed Apr. 22, 2013) & http://www.fao.org/docrep/w3241e/w3241e08.htm (accessed Apr. 19, 2013), 29 pages.
"iStockphoto Announces Plug-in That Allows Users of Microsoft PowerPoint and Word to Download iStock Photos and Illustrations Directly into Presentations and Documents", http://www.istockphoto.com/istockphoto-office-ribbon, iStockphoto, May 17, 2010.
"Sampling (statistics)", entry in Wikipedia, http://en.wikipedia.org/wiki/Sampling_(statistics) (accessed Oct. 26, 2005), 5 pages.
"Sampling Techniques", http://web.archive.org/web/20031031223726/http://cs.fit.edu/~jpmcgee/classes/CSE5800/SamplingTechniques.pdf, Oct. 2003 (accessed Apr. 22, 2013), 12 pages.
05753821.7, "European Application Serial No. 05753821.7, Communication pursuant to Article 94(3) EPC mailed Feb. 5, 2013", Affinnova, Inc., 5 pages.
Adomavicius, Gediminas et al., "Toward the Next Generation of Recommender Systems: A Survey of the State-of-the-Art and Possible Extensions", IEEE Transactions on Knowledge and Data Engineering, vol. 17, No. 6, Jun. 2005, pp. 734-749.
Anthony, Cynthia S. , "Electronic monitoring legislation for businesses with call centers is fraught with problems", Telecommunications, ABI/INFORM Global, vol. 28, No. 3, Mar. 1994, p. 22.

Arsham, Hossein , "Questionnaire Design and Surveys Sampling", http://web.archive.org/web/20040304232826/http://home.ubalt.edu/ntsbarsh/stat-data/Surveys.htm, Mar. 4, 2004 (accessed Apr. 22, 2013), 15 pages.
Balakrishnan, P.V. (Sundar) et al., "Genetic Algorithms for Product Design", Management Science, vol. 42, No. 8, Aug. 1996, pp. 1105-1117.
Bartlett, II, James E. et al., "Organizational Research: Determining Appropriate Sample Size in Survey Research", Information Technology, Learning and Performance Journal, vol. 19, No. 1, Spring 2001, pp. 43-50.
Brown, J. A. et al., "Restricted Adaptive Cluster Sampling", Environmental and Ecological Statistics, vol. 5, 1998, pp. 49-63.
Cabena, Peter et al., "Intelligent Miner for Data Applications Guide", IBM, Redbook, SG24-5252-00, Mar. 1999, 175 pages.
Callery, Matthew J. et al., "Smart Presentation Application", U.S. Appl. No. 61/351,486 as incorporated by reference in US PG Pub. 2011/0302494., filed Jun. 4, 2010, 50 pages.
Cattin, Philippe et al., "Commercial Use of Conjoint Analysis: A Survey", Journal of Marketing, vol. 46, Summer1982, pp. 44-53.
Chen, Doris T. , "Network monitoring and analysis in a large scale PACS and teleradiology environement", AAT 9620717, University of California, Los Angeles, 118 pages, Abstract only which is 2 pages, 1996.
Dahan, Ely et al., "The Predictive Power of Internet-Based Product Concept Testing Using Visual Depiction and Animation", Journal of Production Innovation Management, vol. 17, 2000, pp. 99-109.
Desmond, Michael , "Smart Office Tools", http://www.ics.uci.edu/~nlopezgi/flexitools/presentations/desmond_flexitools_splash2010.pdf, 2010, pp. 1-22.
Desmond, Michael et al., "Towards smart office tools", http://www.ics.uci.edu/~nlopezgi/flexitools/papers/desmond_flexitools_splash2010.pdf, In Proceedings Workshop on Flexible Modeling Tools at SPLASH, Reno, Nevada, USA, Oct. 2010, pp. 1-4.
DSS Research, , "A Review of Conjoint Analysis", DSS Research: The Power of Information, http://dssresearch.com/library/conjoint/conjoint.html, Dec. 1999, pp. 1-8.
Ellis, Charles H. et al., "Comparing Telephone and Fact-to-Face Surveys in Terms of Sample Representativeness: A Meta-Analysis of Demographic Characteristics", Ohio State University, Apr. 1999, 61 pages.
Environmental Protection Agency, "Guidance on Choosing a Sampling Design for Environmental Data Collection", EPA QA/G-5S, Dec. 2002, 178 pages.
Fienberg, Stephen E. et al., "Notes on Stratified Sampling", (for Statistics 36-303: Sampling, Surveys, and Society) Department of Statistics, Carnegie Mellon University, Mar. 12, 2003, 12 pages.
Fly, "Swap an Image in PowerPoint 2007 With Ease", http://www.cgiinteractive.com/blog/2010/12/swap-change-image-powerpoint-2007-ease/, Dec. 23, 2010, pp. 1-3.
Garcia, Fernando D. , "Computer Screen Design Aided by a Genetic Algorithm", Late Breaking Papers at the 2000 Genetic and Evolutionary Computation Conference, D. Whitney, Editor, 2000, pp. 98-101.
Graf, Jeanine et al., "Interactive Evolution of Images", Evolutionary Programming IV—Proc. Fourth Annual Conf.—Evolutionary Programming, MIT Press: Cambridge, Mass, 1995, pp. 53-65.
Gu, Baohua et al., "Sampling and Its Application in Data Mining: A Survey", National University of Singapore, Singapore, Jun. 1, 2000, 31 pages.
Gu, Baohua et al., "Sampling: Knowing Whole from Its Part", Instance Selection and Construction for Data Mining, Chapter 2, May 2, 2001, 32 slides.
Haupt, Randy L. et al., Practical Genetic Algorithms, New York: John Wiley & Sons, Inc., 1998, p. 66-70 and 85-88.
Jacobs, Richard M. , "Educational Research: Sampling a Population", EDU 8603, 2003, 89 slides.
Johnston, Victor S. , Why We Feel: The Science of Human Emotions, Perseus Books: Cambridge, Mass, 1999, pp. 152-155.
Kaye, Barbara K. et al., "Research Methodology:Taming the Cyber Frontier-Techniques for Improving Online Surverys", Social Science Computer Review, vol. 17, No. 3, Fall 1999, pp. 323-337.

(56) References Cited

OTHER PUBLICATIONS

Kim, Hee-Su et al., "Application of Interactive Genetic Algorithm to Fashion Design", Engineering Applications of Artificial Intelligence, (13), 2000, pp. 635-644.

Kim, Hee-Su et al., "Knowledge-based encoding in interactive genetic algorithm for a fashion design aid system", GECCO—2000, Proceedings of the Genetic and Evolutionary Computation Conference, Las Vegas, Nevada, Jul. 10-12, 2000, p. 757.

Lunsford, Thomas R., "Research Forum—The Research Forum Sample—Part 1: Sampling", JPO, vol. 7, No. 3, 1995, 8 pages.

Markowitz, Eric, "How to Create a Great PowerPoint Presentation", http://www.inc.com/guides/201102/how-to-create-a-great-powerpoint-presentation.html, Feb. 7, 2011, pp. 1-5.

Medina, Martin H., Contributions to the Theory of Adaptive Sampling, Doctorate Thesis in Statistics,The Pennsylvania State University, Dec. 2000, 259 pages.

O'Reilly, Una-May et al., "A Preliminary Investigation of Evolution as a Form Design Strategy", Artificial Life VI, MIT Press: Cambridge, MA, 1998, 5 pages.

O'Reilly, Una-May, "Evolution as a design strategy for nonlinear architecture: Generative modeling of 3-D surfaces", 1998, 10 pages.

Ossher, Harold et al., "Flexible modeling tools for pre-requirements analysis: conceptual architecture and research challenges", ACM SIGPLAN Notices—OOPSLA '10, vol. 45, No. 10, Oct. 17-21, 2010, pp. 848-864.

Ossher, Harold et al., "Using tagging to identify and organize concerns during pre-requirements analysis", EA'09, ICSE-09 Workshop on Aspect-Oriented Requirements Engineering and Architecture Design, Vancouver, Canada, May 18, 2009, pp. 25-30.

Pazzani, Michael J., "A Framework for Collaborative, Content-Based and Demographic Filtering", Artificial Intelligence Review, vol. 13, 2000, pp. 393-408.

PCT/US2005/021948, , "International Preliminary Report on Patentability for International Application Serial No. PCT/US2005/021948 mailed Jan. 18, 2007", 9 pages.

PCT/US2005/021948, , "International Search Report for International Application Serial No. PCT/US2005/021948 mailed Nov. 13, 2006", 2 pages.

PCT/US2005/021948, , "Written Opinion for International Application Serial No. PCT/US2005/021948 mailed Nov. 13, 2006", 7 pages.

PCT/US2005/17179, , "International Preliminary Report on Patentability for International Application Serial No. PCT/US2005/17179 mailed Feb. 8, 2007", 5 pages.

PCT/US2005/17179, , "International Search Report for International Application Serial No. PCT/US2005/17179 mailed Jan. 16, 2007", 4 pages.

PCT/US2005/17179, , "Written Opinion for International Application U.S. Appl. No. PCT/US2005/17179, Written Opinion mailed Jan. 16, 2007", 3 pp.

PCT/US2012/028364, , "International Application U.S. Appl. No. PCT/US2012/028364, International Preliminary Report on Patentability and Written Opinion mailed Sep. 19, 2013", Affinnova, Inc, 6 pages.

PCT/US2012/028369, , "International Application U.S. Appl. No. PCT/US2012/028369, International Preliminary Report on Patentability and Written Opinion mailed Sep. 19, 2013", Affinova, Inc, 7 pages.

PCT/US2012/028373, , "International Application U.S. Appl. No. PCT/US2012/028373, International Preliminary Report on Patentability and Written Opinion mailed Sep. 19, 1013", Affinnova, Inc, 7 pages.

PCT/US2012/028375, , "International Application U.S. Appl. No. PCT/US2012/028375, International Preliminary Report on Patentability and Written Opinion mailed Sep. 19, 2013", Affinnova, Inc, 7 pages.

PCT/US2012/028376, , "International Application U.S. Appl. No. PCT/US2012/028376, International Preliminary Report on Patentability and Written Opinion mailed Sep. 19, 2013", Affinnova, Inv, 7 pages.

Reynolds, Reid T., "How Big is Big Enough?", American Demographics, vol. 2, No. 4, 38 pages, Abstract Only, Apr. 1980, 2 pages.

Rowland, Duncan A., "Computer Graphic Control over Human Face and Head Appearance, Genetic Optimisation of Perpetual Characteristics", Ph.D. Thesis, University of St. Andrews, Scotland, Jan. 5, 1998, 103 pages.

Sims, Karl, "Artificial Evolution for Computer Graphics", Computer Graphics vol. 25, No. 4, ACM SIGGRAPH'91 Conference Proceedings, Las Vegas, Nevada, Jul. 1991, pp. 319-328.

Steiner, Winfried J. et al., "A Probabilistic One-Step Approach to the Optimal Product Line Design Problem Using Conjoint and Cost Data", Review of Marketing Science Working Papers, vol. 1, No. 4, Working Paper 4, 20002, pp. 1-40.

Su, Stanley Y. et al., "An internet-based negotiation server for e-commerce", VLDB Journal —The International Journal on Very Large Data Bases, vol. 10, Issue 1, Aug. 2001, pp. 72-90.

Swain, M. J. et al., "Webseer: an Image Search Engine for the World Wide Web", http://citeseerx.ist.psu.edu/viewdoc/download?doi=1 0.1.1.44.9234&rep=rep1 &type=pdf, (1996) Technical Report. University of Chicago, Chicago, IL, USA.

Thompson, Steven K., "Design and Inference in Adaptive Sampling", SSC Annual Meeting, Proceedings of the Survey Methods Section (with English Abstract), Jun. 1997, pp. 1-5.

Thompson, Steven K., "Stratified adaptive cluster sampling", Biometrika, vol. 78, No. 2, 1991, pp. 389-297 (Abstract Only).

Weinberger, Martin, "Getting the Quota Sample Right", Journal of Advertising Research, vol. 13, No. 5, Oct. 1973, pp. 69-72.

Witbrock, Michael et al., "Evolving Genetic Art", Chapter 10 in Evolutionary Design by Computers, 1999, pp. 251-259.

Alspach, Ted, Illustrator 8 Bible, IDG Books Worldwide, Inc., 1999, pp. 40-41, 564 (6 pages).

Belch et al., "Advertising and Promotion: An Integrated Marketing Communications Perspective," 4th Edition, Irwin/McGraw-Hill, (5 pages).

Bradley, Nigel, "Sampling for Internet Surveys. An Examination of Respondent Selection for Internet Research," Journal of Market Research Society, vol. 41, No. 4, Oct. 1999 (9 pages).

Canadian Intellectual Property Office, "Office Action", issued in connection with Canadian Patent Application No. 2,567,588, mailed on Jul. 16, 2014 (3 pages).

Edmonston et al., "How to Succeed with a Focus Group," Advertising Age's Business Marketing, vol. 83, No. 7, Jul. 1998 (3 pages).

Fairfax County Department of Systems Management for Human Services International Brochure, "Overview of Sampling Procedures," Apr. 2003 (8 pages).

Farmer, Tregg, "Using the Internet for Primary Research Data Collection," InfoTek Research Group, Feb. 2, 1999, retrieved from <http://researchinfo.com>, retrieved on May 28, 2014 (5 pages).

International Searching Authority, "International Search Report and Written Opinion," issued in connection with International Patent Application No. PCT/US2014/026808, mailed on Jun. 26, 2014 (10 pages).

International Searching Authority, "International Search Report and Written Opinion," issued in connection with International Patent Application No. PCT/US2014/027812, mailed on Jul. 24, 2014 (10 pages).

Merriam-Webster's Inc., "Designate," "Designation," Merriam-Webster's Collegiate Dictionary 10th Edition, 1999, p. 313 (4 pages).

Microsoft, "Allow Changes to Parts of a Protected Document," Jun. 16, 2010, retrieved from [http://web.archive.org/web/20100616074959/http://office.microsoft.com/en-us/word-help/allow-changes-to-parts-of-a-protected-document-HA010372706. aspx?] (2 pages).

Microsoft, "Pitchbook Template," Mar. 20, 2010, retrieved from [http://web.archive.org/web/20110320041349/http://office. microsoft.com/en-us/templates/pitchbook-TC010176928.aspx] (7 pages).

Mitchell, Paul, "Designing an Optimal Quota Assignment Scheme When Using Independent Controls," Abstract Only, retrieved from [http://search.proquest.com/printviewfile?accountid=14753], retrieved on May 28, 2014 (1 page).

Northern Arizona University, "Introduction to Research-Lesson 5-1-1: Population and Sampling Procedures," retrieved from <jan.ucc.

(56) References Cited

OTHER PUBLICATIONS nau.edu/~mid/edr610/class/sampling/procedures/lesson5-1-1.html>, retrieved on May 28, 2014 (9 pages).
Nowalk, Brandon, "But What She Said:Post-Mad Men: Art Imitating Life," Aug. 31, 2010, retrieved from <http://bnowalk.blogspot.com/2010/08/post-mad-men-art-imitating-life.html> (4 pages).
O'Guinn et al., Advertising, South-Western College Publishing, 1998, pp. 321-340 (23 pages).
Panaho, David, "Pitch Cards," 2010, retrieved from <http://www.davidpanaho.com/#Pitch-Cards> (3 pages).
Smith, Graham, "How Many Ideas Do You Show Your Clients?" Business, Clients, Ideas, Dec. 28, 2009, retrieved from <http://www.smashingmagazine.com/2009/12/28/discuss-how-many-ideas-do-you-show-clients/> (8 pages).
United States Patent and Trademark Office, "Final Office Action," issued in connection with U.S. Appl. No. 13/415,720, mailed on Dec. 9, 2014 (51 pages).
United States Patent and Trademark Office, "Final Office Action," issued in connection with U.S. Appl. No. 13/415,732, mailed on Dec. 9, 2014 (45 pages).
United States Patent and Trademark Office, "Final Office Action," issued in connection with U.S. Appl. No. 13/415,757, mailed on May 20, 2014, 103 pages.
United States Patent and Trademark Office, "Non-Final Office Action," issued in connection with U.S. Appl. No. 13/415,720, mailed on Mar. 31, 2014 (72 pages).
United States Patent and Trademark Office, "Non-Final Office Action," issued in connection with U.S. Appl. No. 13/415,720, mailed on Sep. 10, 2013 (854 pages).
United States Patent and Trademark Office, "Non-Final Office Action," issued in connection with U.S. Appl. No. 13/415,732, mailed on Apr. 2, 2014 (39 pages).
United States Patent and Trademark Office, "Non-Final Office Action," issued in connection with U.S. Appl. No. 13/415,732, mailed on Sep. 10, 2013 (28 pages).
United States Patent and Trademark Office, "Non-Final Office Action," issued in connection with U.S. Appl. No. 13/415,748, mailed on Nov. 14, 2013 (863 pages).
United States Patent and Trademark Office, "Non-Final Office Action," issued in connection with U.S. Appl. No. 14/208,041, mailed on Aug. 19, 2014 (886 pages).
United States Patent and Trademark Office, "Non-Final Office Action," issued in connection with U.S. Appl. No. 13/415,757, mailed on Jan. 7, 2015, 16 pages.
United States Patent and Trademark Office, "Non-Final Office Action," issued in connection with U.S. Appl. No. 13/415,757, mailed on Nov. 6, 2013, 173 pages.
United States Patent and Trademark Office, "Non-Final Office Action," issued in connection with U.S. Appl. No. 14/208,041, mailed on Aug. 19, 2014, 886 pages.
United States Patent and Trademark Office, "Notice of Allowance," issued in connection with U.S. Appl. No. 13/415,748, mailed on Jun. 20, 2014 (35 pages).
Waters, Kevin M., "Designing Screening Questionnaires to Minimize Dishonest Answers," Quirks Marketing Research Media, May 1991, retrieved from <http://www.quirks.com/articles/a1991/19910504.aspx?searchID=622320843&sort=5&pg=1>, retrieved on May 28, 2014 (7 pages).
Watt, James, "Using the Internet for Quantitative Survey Research," Quirks Marketing Research Media, Jun. 1997, retrieved from <http://www.quirks.com/articles/a1997/19970610.aspx?searchID=17777257>, retrieved on May 28, 2014 (11 pages).
Wikipedia, "Quota Sampling," retrieved from <http://en.wikipedia.org/wiki/Quota_sampling>, retrieved on May 28, 2014 (1 page).
Witte et al., "Research Methodology-Method and Representation in Internet-Based Survey Tools-Mobility, Community, and Cultural Identify in Survey 2000," Social Science Computer Review, vol. 18, No. 2, Summer 2000, pp. 179-195 (17 pages).
Zigras et al., "Chapter 7: Decision Support Systems and Marketing Research," Nelson, a division of Thomson Canada Limited, 2002 (54 pages).
United States Patent and Trademark Office, "Final Office Action," issued in connection with U.S. Appl. No. 14/208,041, mailed on Mar. 31, 2015 (21 pages).
United States Patent and Trademark Office, "Notice of Allowance," issued in connection with U.S. Appl. No. 14/415,732, mailed Apr. 7, 2015, 23 pages.
United States Patent and Trademark Office, "Office Action," issued in connection with U.S. Appl. No. 13/415,720, mailed Apr. 3, 2015, 61 pages.
Gove et al., "Webster's Third New International Dictionary of the English Language Unabridged" (1967), p. 2229.
Shaffer et al.., "New Perspectives on Microsoft Office 2007, Brief, Premium Video Edition" (Feb. 9, 2010), p. 38 [retrieved from https://play.google.com/store/books/details?id=aZw8AAAAQBAJ&rdid=book-aZw8AAAAQBAJ&rdot=1&source=gbs_vpt_read].
Screenshots of Microsoft PowerPoint® 2010, (released Jun. 15, 2010) [screenshots retrieved Mar. 30, 2015], pp. 1-10.
Wikipedia, "Microsoft Office 2010" (Sep. 21, 2010), pg. 1 [retrieved from http://en.wikipedia.org/w/index.php?title=Microsoft_Office_2010&oldid=386045762].
United States Patent and Trademark Office, "Final Office Action," issued in connection with U.S. Appl. No. 13/415,757, mailed Jun. 5, 2015, 50 pages.
Webster'S Third New International Dictionary of the English Language Unabridged, "Suppress," p. 2298, 2 pages.
Mansurov, "How to Organize Pictures," [retrieved from http://photographylife.com/how-to-organize-pictures], Jan. 24, 2010, 11 pages.
United States Patent and Trademark Office, "Final Office Action," issued in connection with U.S. Appl. No. 13/415,720, mailed on Sep. 17, 2015, 29 pages.
United States Patent and Trademark Office, "Notice of Allowance," issued in connection with U.S. Appl. No. 13/415,757, mailed on Sep. 21, 2015, 30 pages.
United States Patent and Trademark Office, "Notice of Allowance," issued in connection with U.S. Appl. No. 14/208,041, mailed on Sep. 14, 2015, 37 pages.

* cited by examiner

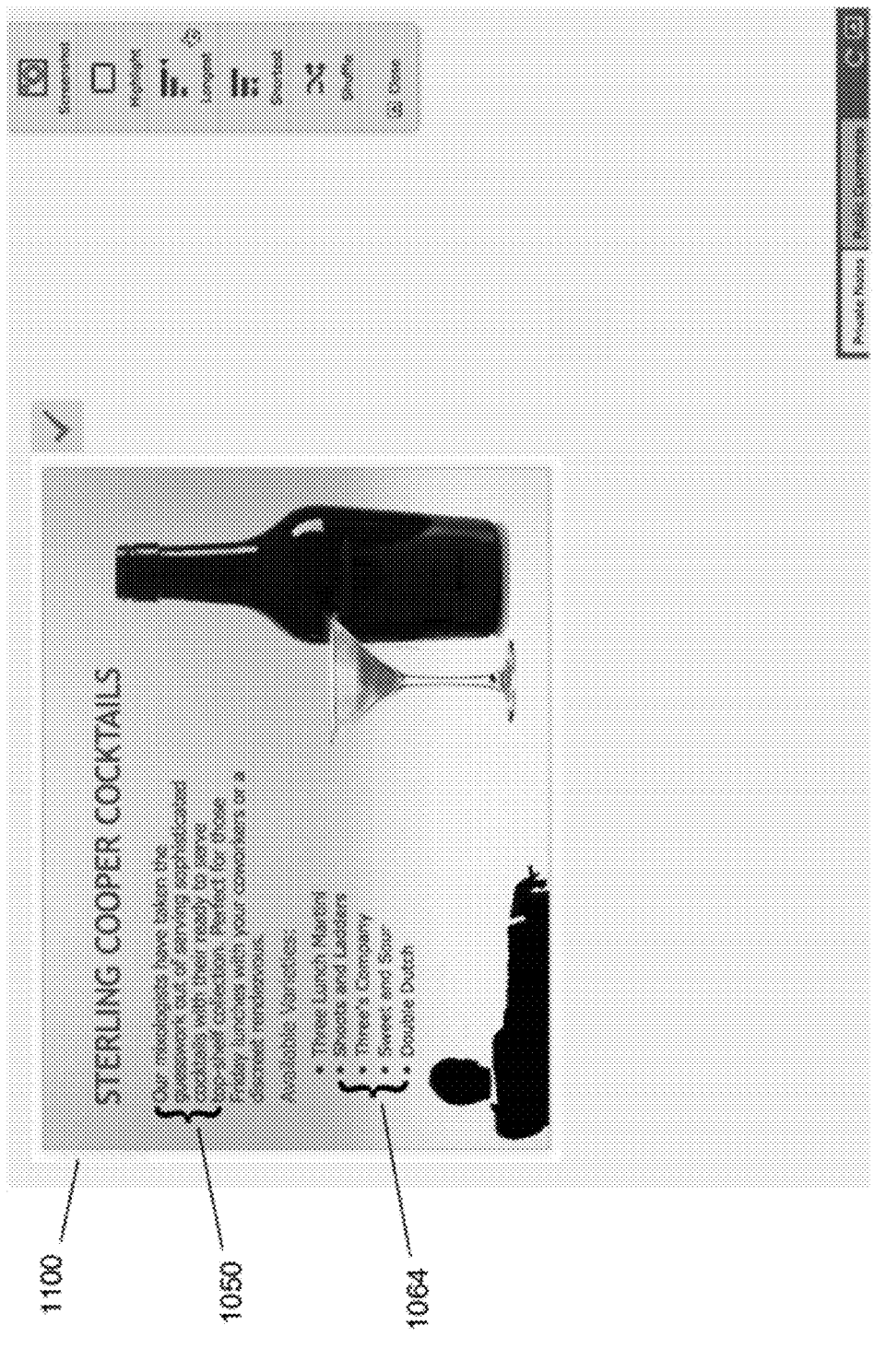

SYSTEM AND METHOD FOR CONCEPT DEVELOPMENT

CROSS-REFERENCE TO RELATED APPLICATIONS

This application claims the benefit of U.S. provisional patent application Ser. Nos. 61/450,531, 61/450,546, and 61/450,559, all entitled "CONCEPT STUDIO METHOD AND SYSTEM," filed on Mar. 8, 2011, and claims the benefit of U.S. provisional patent application Ser. No. 61/506,503, entitled "CONCEPT STUDIO METHOD AND SYSTEM," filed on Jul. 11, 2011, the entire disclosures of all of which applications are incorporated herein by reference.

TECHNICAL FIELD

The present disclosure relates to concept development, and more particularly relates to concept development for products and services.

BACKGROUND OF THE DISCLOSURE

In industrial settings, the process of developing new products and services may often involve a number of cycles that include divergent or generative ideation phases, followed by narrowing or selection phases in which the ideas are assessed and tested, and decisions made further to develop or market an idea. One example of a divergent or generative activity is the well-known brainstorming or ideation session. Examples of narrowing activities include concept testing, concept optimization, conjoint measurement and forecasting models.

Several activities carried out during the product development process can be used to support either phase, depending on how they are structured. For example, focus groups and 1-on-1 interviews with consumers can be used during the ideation phase, as open-ended processes for generating new ideas. They can also be used to assess and test the viability of an already formulated concept for a new product or service.

Typically, general-purpose office software applications are used to capture and organize the different ideas and their elements, and the many variants for each of these elements. Spreadsheet applications such as Microsoft® Excel® and Apple® Numbers® are commonly used for that purpose, and word processing applications, such as Microsoft® Word and Apple® Pages® are also used. Presentation software applications such as Microsoft® PowerPoint® and Apple® Keynote® are also commonly used to develop visual representations of the proposed product concepts. (Microsoft, Excel, and PowerPoint are all trademarks of Microsoft Corporation in the United States, other countries, or both; Apple, Notes, Pages, and Keynote are all trademarks of Apple Inc. in the United States, other countries, or both.)

The use of such common office productivity applications, which are not optimized for the task of developing and exploring concepts with varying elements, presents a number of difficulties and challenges that result in poor productivity. For example, the use of disparate applications, one for capturing the idea elements and their variants and another for visually representing the idea, itself presents a set of challenges when it comes to communicating and sharing this information with the other stakeholders involved in the product development process. Two different documents may need to be shared or emailed back and forth between individuals participating in the concept development process. Furthermore, it may be desired that the contents of the documents be kept up-to-date and synchronized throughout the various collaborative editing and commenting sessions.

The use of a presentation application to generate visual representations of the new idea or concept often leads to a number of difficulties as well. For example, for every concept variation that is desired to be represented, a copy of the original representation slide must be created, and the elements that are different edited (typically by copying and pasting from element variants in the spreadsheet document). If some other element is changed, multiple slides may have to be updated. Because of the repetitive nature of this process, it may often only be practical to generate a tiny fraction of the possible alternatives enabled by the element variants.

Typically, the outcome of the generative phases in the product development process is a set of ideas and variations thereof. It may often be desirable that a product idea be described and represented in a way sufficient to differentiate it from other ideas and, if it fits into an existing product category, to differentiate it from in-market incumbents (in particular, competitors' products). The description must also be appropriate for use in the next phase of the development process, be it presenting the idea to senior management for approval, or using the description and representation to conduct consumer research in order to assess the viability of the idea. Accordingly, it may often be necessary to generate various different versions of a representation, to allow possible points of differentiation to be explored.

SUMMARY OF THE DISCLOSURE

According to a first implementation, a method may include providing a framework for building a visual representation of a product concept. The visual representation may include one or more of a textual component and a graphical component. A designation may be received of an element within at least one of the textual component and the graphical component as a dynamic element. The dynamic element may be associated with a variant list including one or more element variants. A selection may be received of a first element variant from the variant list. A first instantiation of the visual representation may be generated including the first element variant as the dynamic element.

One or more of the following features may be included. Receiving the designation of the element may include receiving a user selection of the element from within one or more of the textual component and the graphical component. Receiving the designation of the element may include identifying an escape sequence within one or more of the textual component and the graphical component. The element may include an image within the graphical component. The element may include one or more words within the textual component.

Associating the dynamic element with the variant list may include receiving a user input including the one or more element variants. The method may also include receiving a selection of a second element variant from the variant list. A second instantiation of the visual representation may be generated including the second element variant as the dynamic element.

In another implementation, a system includes one or more processors configured to provide a framework for building a visual representation of a product concept, the visual representation including one or more of a textual component and a graphical component; one or more processors configured to receive a designation of an element within at least one of the textual component and the graphical components as a dynamic element; one or more processors configured to associate the dynamic element with a variant list including one or more element variants; one or more processors configured to receive a selection of a first element variant from the variant list; and one or more processors configured to generate a first instantiation of the visual representation including the first element variant as the dynamic element.

One or more of the following features may be included. Receiving the designation of the element may include receiving a user selection of the element from within one or more of the textual component and the graphical component. Receiving the designation of the element may include identifying an escape sequence within one or more of the textual component and the graphical component. Associating the dynamic element with the variant list may include receiving a user input including the one or more element variants. In some embodiments, the element may include an image within the graphical component. In some embodiments, the element may include one or more words within the textual component.

In another implementation, a computer program product residing on a computer readable medium having a plurality of instructions stored thereon which, when executed by a processor, cause the processor to perform operations including providing a framework for building a visual representation of a product concept, the visual representation including one or more of a textual component and a graphical component; receiving a designation of an element within at least one of the textual component and the graphical component as a dynamic element; associating the dynamic element with a variant list including one or more element variants; receiving a selection of a first element variant from the variant list; and generating a first instantiation of the visual representation including the first element variant as the dynamic element.

One or more of the following features may be included. In some embodiments, the receiving the designation of the element may include receiving a user selection of the element from within one or more of the textual component and the graphical component. Receiving the designation of the element may include identifying an escape sequence within one or more of the textual component and the graphical component. Associating the dynamic element with the variant list may include receiving a user input including the one or more element variants. In some embodiments, the element may include an image within the graphical component. In some embodiments, the element may include one or more words within the textual component.

According to another implementation, a method may include providing a framework for building a visual representation of a product concept. The visual representation may include one or more of a textual component and a graphical component. A designation may be received of a first element within at least one of the textual component and the graphical component as a first dynamic element. A designation may be received of a second element within at least one of the textual component and the graphical component as a second dynamic element. The first dynamic element may be associated with a first variant list including one or more first element variants. The second dynamic element may be associated with a second variant list including one or more second element variants. A constraint may be associated between at least one of the one or more first element variants and at least one of the one or more second element variants. A selection may be received of a first element variant from the first variant list. A selection may be received of a second element variant from the second variant list. A first instantiation of the visual representation may be generated including the first element variant as the first dynamic element and the second element variant as the second dynamic element based upon the constraint.

One or more of the following features may be included. The constraint may include a prohibitory constraint. The constraint may include a permissive constraint. The constraint may be based on one or more of a business rule, a logical rule, and an algebraic rule. Generating the first instantiation of the visual representation may include generating an error based on the constraint. The error may include an identification of a constraint violation. The error may include a suggestion of an alternate second element variant.

In another implementation, a system includes one or more processors configured to provide a framework for building a visual representation of a product concept, the visual representation including one or more of a textual component and a graphical component; one or more processors configured to receive a designation of a first element within at least one of the textual component and the graphical component as a first dynamic element; one or more processors configured to receive a designation of a second element within at least one of the textual component and the graphical component as a second dynamic element; one or more processors configured to associate the first dynamic element with a first variant list including one or more first element variants; one or more processors configured to associate the second dynamic element with a second variant list including one or more second element variants; one or more processors configured to associate a constraint between at least one of the one or more first element variants and at least one of the one or more second element variants; one or more processors configured to receive a selection of a first element variant from the first variant list; one or more processors configured to receive a selection of a second element variant from the second variant list; and one or more processors configured to generate a first instantiation of the visual representation including the first element variant as the first dynamic element and the second element variant as the second dynamic element based upon the constraint.

One or more of the following features may be included. The constraint may include a prohibitory constraint. The constraint may include a permissive constraint. The constraint may be based on one of a business rule and a logical rule. Generating the first instantiation of the visual representation may include generating an error based on the constraint. The error may include an identification of a constraint violation. The error may include a suggestion of an alternate second element variant.

In another implementation a computer program product residing on a computer readable medium having a plurality of instructions stored thereon which, when executed by a processor, cause the processor to perform operations including providing a framework for building a visual representation of a product concept, the visual representation including one or more of a textual component and a graphical component; receiving a designation of a first element within at least one of the textual component and the graphical component as a first dynamic element; receiving a designation of a second element within at least one of the textual component and the graphical component as a second dynamic element; associating the first dynamic element with a first variant list including one or more first element variants; associating the second dynamic element with a second variant list including one or more second element variants; associating a constraint between at least one of the one or more first element variants and at least one of the one or more second element variants; receiving a selection of a first element variant from the first variant list; receiving a selection of a second element variant from the second variant list; and generating a first instantiation of the visual representation including the first element variant as the first dynamic element and the second element variant as the second dynamic element based upon the constraint.

One or more of the following features may be included. The constraint may include a prohibitory constraint. The constraint may include a permissive constraint. The constraint may be based on one or more of a business rule, a logical rule, and a mathematical rule. Generating the first instantiation of the visual representation may include generating an error based on the constraint. The error may include an identification of a constraint violation. The error may include a suggestion of an alternate second element variant.

In an embodiment, a method may include providing a framework for building a visual representation of a product concept. The visual representation may include one or more of a textual component and a graphical component. A designation may be received of an element within at least one of the textual component and the graphical component as a dynamic element. The dynamic element may be associated with a variant list including a plurality of element variants. A selection may be received of a subset of the plurality of element variants from the variant list. A first instantiation of the visual representation may be generated including a combination of the subset of the plurality of element variants as the dynamic element.

One or more of the following features may be included. Receiving the selection of the plurality of element variants may include receiving layout information associated with the plurality of element variants. The layout information may include order information associated with the plurality of element variants. The layout information may include presentation information associated with the plurality of element variants. The layout information may include position information associated with the plurality of element variants.

In another implementation, a system includes one or more processors configured to provide a framework for building a visual representation of a product concept, the visual representation including one or more of a textual component and a graphical component; one or more processors configured to receive a designation of an element within at least one of the textual component and the graphical component as a dynamic element; one or more processors configured to associate the dynamic element with a variant list including a plurality of element variants; one or more processors configured to receive a selection of a subset of the plurality of element variants from the variant list; and one or more processors configured to generate a first instantiation of the visual representation including a combination of the subset of the plurality of element variants as the dynamic element.

One or more of the following features may be included. Receiving the selection of the subset of the plurality of element variants may include receiving layout information associated with the plurality of element variants. The layout information may include order information associated with the plurality of element variants. The layout information may include presentation information associated with the plurality of element variants. The layout information may include position information associated with the plurality of element variants.

In another implementation, a computer program product residing on a computer readable medium having a plurality of instructions stored thereon which, when executed by a processor, cause the processor to perform operations including providing a framework for building a visual representation of a product concept, the visual representation including one or more of a textual component and a graphical component; receiving a designation of an element within at least one of the textual component and the graphical component as a dynamic element; associating the dynamic element with a variant list including a plurality of element variants; receiving a selection of a subset of the plurality of element variants from the variant list; and generating a first instantiation of the visual representation including a combination of the subset of the plurality of element variants as the dynamic element.

One or more of the following features may be included. Receiving the selection of the subset of the plurality of element variants may include receiving layout information associated with the plurality of element variants. The layout information may include order information associated with the plurality of element variants. The layout information may include presentation information associated with the plurality of element variants. The layout information may include position information associated with the plurality of element variants.

In an implementation, a method may include identifying a dynamic element within framework for building a visual representation of a product concept. The visual representation may include one or more of a textual component and a graphical component. The dynamic element may be associated with a variant list including one or more variant elements. One of a longest variant element and a shortest variant element may be identified from within the variant list. A first instantiation of a visual representation of a product concept may be generated including the one of the longest variant element and the shortest variant element as the dynamic element.

One or more of the following features may be included. Identifying the dynamic element may include identifying a plurality of dynamic elements, each of the plurality of dynamic elements associated with a respective variant list of a plurality of variant lists. Identifying one of the longest variant element and the shortest variant element may include identifying one of the longest variant element associated with each of the plurality of dynamic elements and the shortest variant element included within a respective variant list associated with each of the plurality of dynamic elements. Identifying one of the longest variant element and the shortest variant element included within a respective variant list associated with each of plurality of dynamic elements may be based on a constraint associated between two or more dynamic elements.

Generating the first instantiation of the visual representation may include adjusting a formatting of the visual representation based on the one of the longest element variant and the shortest element variant. Adjusting the formatting of the visual representation may include altering a size property associated with one or more components of the visual representation. Altering the size property associated with one or more components of the visual representation may include altering the size property based on one or more format rules.

In another implementation, a system includes one or more processors configured to identify a dynamic element within framework for building a visual representation of a product concept, the visual representation including one or more of a textual component and a graphical component, the dynamic element associated with a variant list including one or more variant elements; one or more processors configured to identify one of a longest variant element and a shortest variant element from within the variant list; and one or more processors configured to generate a first instantiation of a visual representation of a product concept including the one of the longest variant element and the shortest variant element as the dynamic element.

One or more of the following features may be included. Identifying the dynamic element may include identifying a plurality of dynamic elements where each of the plurality of dynamic elements may be associated with a respective variant list of a plurality of variant lists. In some embodiments, identifying either the longest variant element or the shortest variant element may include identifying either the longest variant element associated with each of the plurality of dynamic elements or the shortest variant element which may be included within a respective variant list which may be associated with each of the plurality of dynamic elements. Identifying either the longest variant element or the shortest variant element included within a respective variant list associated with each of plurality of dynamic elements may be based on a constraint associated between two or more dynamic elements. Generating the first instantiation of the visual representation may include adjusting a formatting of the visual representation based on either the longest element variant or the shortest element variant. Adjusting the formatting of the visual representation may include altering a size property associated with one or more components of the visual representation. Altering the size property associated with one or more components of the visual representation may include altering the size property based on one or more format rules.

In another implementation, a computer program product residing on a computer readable medium having a plurality of instructions stored thereon which, when executed by a processor, cause the processor to perform operations including identifying a dynamic element within framework for building a visual representation of a product concept, the visual representation including one or more of a textual component and a graphical component, the dynamic element associated with a variant list including one or more variant elements; identifying one of a longest variant element and a shortest variant element from within the variant list; and generating a first instantiation of a visual representation of a product concept including the one of the longest variant element and the shortest variant element as the dynamic element.

One or more of the following features may be included. Identifying the dynamic element may include identifying a plurality of dynamic elements where each of the plurality of dynamic elements may be associated with a respective variant list of a plurality of variant lists. In some embodiments, identifying either the longest variant element or the shortest variant element may include identifying either the longest variant element associated with each of the plurality of dynamic elements or the shortest variant element which may be included within a respective variant list which may be associated with each of the plurality of dynamic elements. Identifying either the longest variant element or the shortest variant element included within a respective variant list associated with each of plurality of dynamic elements may be based on a constraint associated between two or more dynamic elements. Generating the first instantiation of the visual representation may include adjusting a formatting of the visual representation based on either the longest element variant or the shortest element variant. Adjusting the formatting of the visual representation may include altering a size property associated with one or more components of the visual representation. Altering the size property associated with one or more components of the visual representation may include altering the size property based on one or more format rules.

According to an implementation, a method may include providing a framework for building a visual representation of a product concept. The visual representation may include one or more of a textual component and a graphical component. A designation may be received of a first element within at least one of the textual component and the graphical component as a dynamic element. The dynamic element may be associated with a variant list including one or more element variants. A second element may be identified corresponding to the first element. The second element may be linked with the first element. A selection may be received of a first element variant from the variant list. A first instantiation of the visual representation may be generated including the first element variant as the dynamic element and including the first element variant as the second element.

One or more of the following features may be included. Receiving the designation of the element may include receiving a user selection of the element from within one or more of the textual component and the graphical component. Identifying the second element corresponding to the first element may include searching at least one of the textual component and the graphical component based on the first element.

Linking the second element with the first element may include replacing the second element with an escape sequence associated with the dynamic element. Linking the second element with the first element may include receiving a linking designation. Associating the dynamic element with the variant list may include receiving a user input including the one or more element variants.

The method may further include receiving a selection of a second element variant from the variant list. A second instantiation of the visual representation may be generated including the second element variant as the dynamic element and including the second element variant as the second element.

In another implementation, a system includes one or more processors configured to provide a framework for building a visual representation of a product concept, the visual representation including one or more of a textual component and a graphical component; one or more processors configured to receive a designation of a first element within at least one of the textual component and the graphical component as a dynamic element; one or more processors configured to associate the dynamic element with a variant list including one or more element variants; one or more processors configured to identify a second element corresponding to the first element; one or more processors configured to link the second element with the first element; one or more processors configured to receive a selection of a first element variant from the variant list; and one or more processors configured to generate a first instantiation of the visual representation including the first element variant as the dynamic element and including the first element variant as the second element.

One or more of the following features may be included. Receiving the designation of the element may include receiving a user selection of the element from within one or more of the textual component and the graphical component. Identifying the second element corresponding to the first element may include searching at least one of the textual component and the graphical component based on the first element. Linking the second element with the first element may include replacing the second element with an escape sequence associated with the dynamic element. Linking the second element with the first element may include receiving a linking designation. Associating the dynamic element with the variant list may include receiving a user input including the one or more element variants. The system may include one or more processors configured to receive a selection of a second element variant from the variant list and one or more processors configure to generate a second instantiation of the visual representation including the second element variant as the dynamic element and including the second element variant as the second element.

In another implementation, a computer program product residing on a computer readable medium having a plurality of instructions stored thereon which, when executed by a processor, cause the processor to perform operations including providing a framework for building a visual representation of a product concept, the visual representation including one or more of a textual component and a graphical component; receiving a designation of a first element within at least one of the textual component and the graphical component as a dynamic element; associating the dynamic element with a variant list including one or more element variants; identifying a second element corresponding to the first element; linking the second element with the first element; receiving, by the one or more processors, a selection of a first element variant from the variant list; and generating a first instantiation of the visual representation including the first element variant as the dynamic element and including the first element variant as the second element.

One or more of the following features may be included. Receiving the designation of the element may include receiving a user selection of the element from within one or more of the textual component and the graphical component. Identifying the second element corresponding to the first element may include searching at least one of the textual component and the graphical component based on the first element. Linking the second element with the first element may include replacing the second element with an escape sequence associated with the dynamic element. Linking the second element with the first element may include receiving a linking designation. Associating the dynamic element with the variant list may include receiving a user input including the one or more element variants. The computer program product may include receiving a selection of a second element variant from the variant list and generating a second instantiation of the visual representation including the second element variant as the dynamic element and including the second element variant as the second element.

The details of one or more implementations are set forth in the accompanying drawings and the description below. Other features will become apparent from the description, the drawings, and the claims.

BRIEF DESCRIPTION OF THE SEVERAL VIEWS OF THE DRAWINGS

FIG. 24 graphically depicts a user interface that may be generated, at least in part, by the concept development process of FIG. 1.

FIG. 25 graphically depicts a user interface that may be generated, at least in part, by the concept development process of FIG. 1.

DETAILED DESCRIPTION OF THE INVENTION

Figure 1:
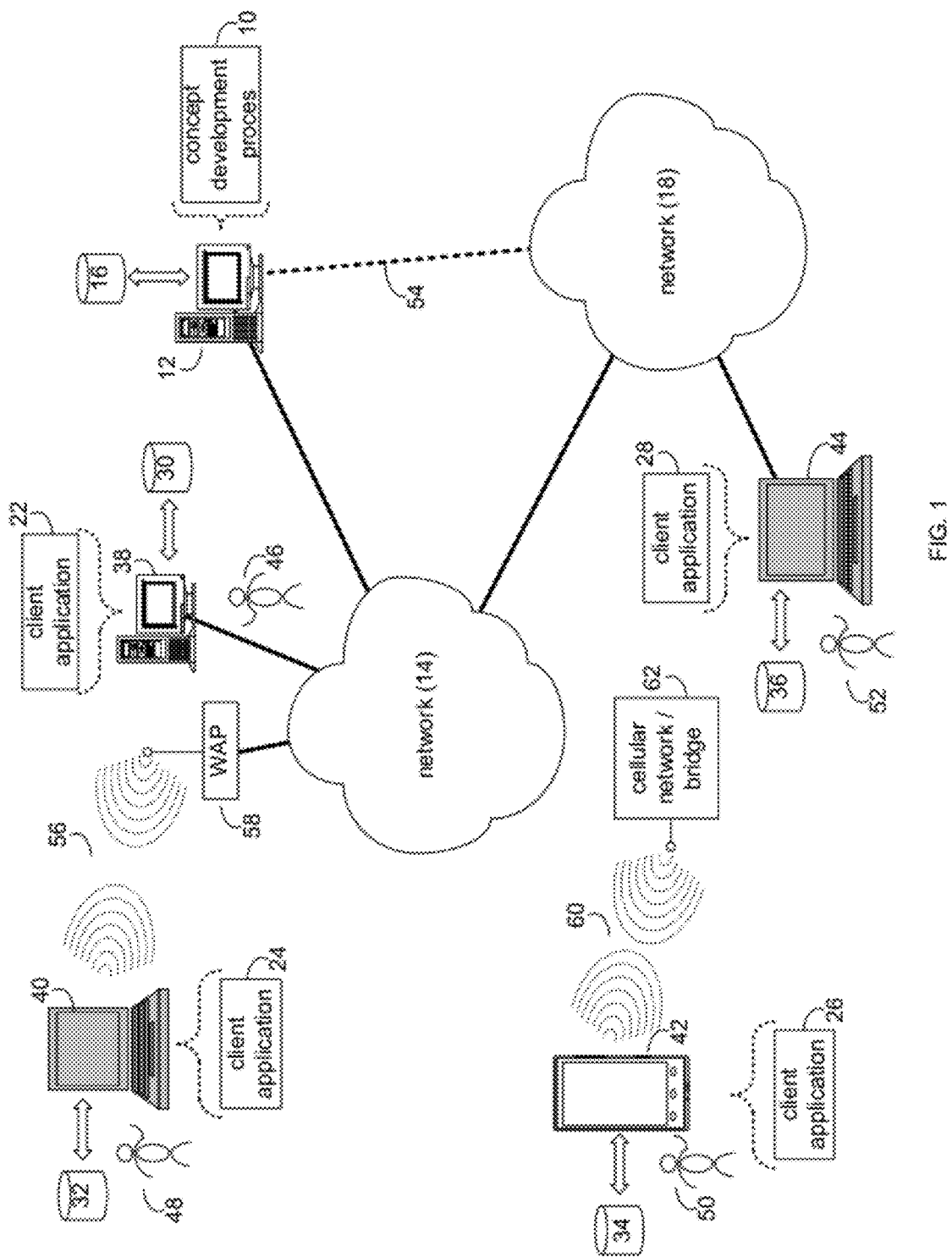
FIG. 1 diagrammatically depicts a concept development process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, and/or in scripting languages such as JavaScript programming language or the Groovy programming language. Furthermore, various application programming interfaces (APIs) and/or application development frameworks such as the Dojo or Grails development frameworks may be used in writing the computer program. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown concept development process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

As will be described in greater detail below, concept development process 10 may provide a framework for building a visual representation of a product concept. The visual representation may include one or more of a textual component and a graphical component. Concept development process 10 may also receive a designation of an element within at least one of the textual component and the graphical components as a dynamic element. The dynamic element may be associated with a variant list including one or more element variants. Concept development process 10 may receive a selection of a first element variant from the variant list. Concept development process 10 may also generate a first instantiation of the visual representation including the first element variant as the dynamic element.

The instruction sets and subroutines of concept development process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® HTTP Server, Apache® Tomcat® application server, that allows for HTTP (i.e., HyperText Transfer Protocol) access to server computer 12 via network 14 (Webserver is a trademark of Novell Corporation in the United States, other countries, or both; and Apache and Tomcat are registered trademarks of Apache Software Foundation in the United States, other countries, or both). Network 14 may be connected to one or more secondary networks (e.g., network 18), examples of which may include but are not limited to: a local area network; a wide area network; or an intranet, for example.

In general, concept development process 10 may provide a framework for building a visual representation of a product concept. For example, concept development process 10 may allow text and/or graphics associated with the concept to be developed, arranged and/or manipulated. The visual representation may include, but is not limited to, product information, e.g., for market study or consumer focus group research, advertisements, whether in print or online, advertisement campaigns, promotional campaigns; package designs; architectural designs; website and e-commerce site designs, including navigation schemes; the design or graphical user interfaces for computers and other electronic devices. Concept development process 10 may be accessed by one or more client applications, e.g., client applications 22, 24, 26, 28, thereby facilitating virtual meetings and/or remote collaboration. Examples of client application 22, 24, 26, 28 may include, but are not limited to, web browsers (e.g., Safari®, Chrome®, Internet Explorer®; Safari is a trademark of Apple Inc. in the United States, other countries, or both; Chrome is a trademark of Google Inc. in the United States, other countries, or both; Internet Explorer is a trademark of Microsoft Corporation in the United Sates, other countries, or both) or purpose specific application that permit access to concept development process.

In addition/as an alternative to being a server-side process, the concept development process may be a client-side process (not shown) that may reside on a client electronic device (described below) and may interact with a client application (e.g., one or more of client applications 22, 24, 26, 28). Further, the concept development process may be a hybrid server-side/client-side process that may interact with server-side concept development process and a client application (e.g., one or more of client applications 22, 24, 26, 28). As such, the concept development process may reside, in whole, or in part, on server computer 12 and/or one or more client electronic devices.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, tablet computer or the like), notebook computer 44, for example. Each of client electronic devices 38, 40, 42, 44 may execute an appropriate operating system, for example, Mac OS, iOS, Android OS, Windows, or other suitable operating system. (Mac OS is a trademark of Apple Inc. in the United States, other countries, or both; iOS is a trademark of Cisco Systems, Inc.; Android is a trademark of Google Inc. in the United States, other countries, or both; Windows is a trademark of Microsoft Corporation in the United Sates, other countries, or both.)

Using client applications 22, 24, 26, 28, users 46, 48, 50, 52 may access concept development process 10 and may e.g., create visual representations of a product concept. Users 46, 48, 50, 52 may access concept development process 10 directly through the device on which the client application (e.g., client applications 22, 24, 26, 28) is executed, namely client electronic devices 38, 40, 42, 44, for example. Users 46, 48, 50, 52 may access concept development process 10 directly through network 14 or through secondary network 18. Further, server computer 12 (i.e., the computer that executes concept development process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

In general, concept development process 10 may provide one or more tools and/or features that may facilitate the development of product concepts. As used herein, a "product" may include either a product or a service in the most general commercial sense. Examples of products may include, for example, fast moving consumer goods as may be found in a supermarket, such as: salad dressing, frozen dinners, dairy products, laundry detergent, fabric softener, disposable utensils, pet food and other pet supplies such as cat litter, soap, shampoo, toothpaste and other personal grooming products and cosmetics. Other examples of products may include consumer goods such as cameras, personal computers, gaming consoles, telephone handsets. Products may also include durables goods such as automobiles and their accessories, white goods (washers, dryers, dishwashers, refrigerators), television sets, musical instruments, furniture, building materials, and so on. Products may also include sporting goods such as skis, ski boots, tennis rackets, bicycle, athletic shoes, and so on. Products may also include clothing and apparel such as shoes, ties, shirts, dresses, coats, and so on. Products as used herein may also include pharmaceutical products, both over-the-counter remedies such as analgesics, cold and flu medications, and antacids, as well as prescription drugs for various conditions such as COPD, diabetes, high blood pressure and elevated cholesterol levels, as well as medical devices and their accessories.

Services, which may also be included under the general term "products" may include, for example, financial services offerings such as credit cards plans, checking, savings and investment accounts; investments products such as mutual funds and retirement plans; insurance products such as life insurance policies or health insurance plans. Other examples of services may include telecommunications plans for cellular telephones or for internet access, cable TV and land-line telephone service; transportation services; vacation plans; news delivery plans, and so on. Further examples of products and services as used herein may include restaurant menus and offerings, including those of fast-food restaurants.

Products may also include, without limitation, advertisements, whether in print or online, advertisement campaigns, promotional campaigns; products and services catalogues; package designs; architectural designs; website and e-commerce site designs, including website navigation schemes; the design or graphical user interfaces for computers and other electronic devices; storyboards for TV or online video advertisements; storyboards for movies, movie trailers, TV series, and so on.

In the fast moving consumer goods industry for example, where product innovation and testing are conducted with high frequency, the representation of a new product idea may often follow a relatively standardized structure. For example, typically, a concept "card" or concept representation may be generated, and may include elements such as: a) a brand name and a sub-brand if applicable, and an associated brand logo; b) an insight or need state, that may typically include a small paragraph setting out the consumer need or pain point, which the product proposes to address; c) a paragraph introducing the new product and setting out its benefits, which may generally address the above need state; d) one or more sentences listing features of the product; e) a reason(s)-to-believe paragraph, explaining how the features would function to address the need state and deliver the above stated benefit; f) a representation of the product form or package design; g) mood imagery. Additional/alternative elements and/or combinations of elements may be equally utilized. For example, in the case of a pharmaceutical product, the relevant elements used to represent the product may include: a) the condition to be treated and the prescribing context; b) the drug form and dosage; c) one or more efficacy claims for the drug; d) one or more potential side effects; e) relative cost of a dose.

Concept development process may include one or more tools and or features that may facilitate the development, organization, and presentation of several variants for one or more of the elements listed in the above examples for possible consideration of use associated with the product. For example, several need states for which a new product would be relevant may be developed; furthermore, several ways of describing each of the need states may also be developed. As another example, a pharmaceutical scientist may be considering a given compound for treating different conditions, and may be considering a range of dosing options. As a result of the combinatorial nature of the situation, the number of potential variations on a given idea can quickly rise to hundreds and thousands of alternatives, often exceeding several millions. For example, it only takes 10 variants for each of 6 elements to generate 1 million alternatives for a given idea. Concept development process 10 may include one or more tools and/or features that may facilitate the development, organization, and presentation of various combinations of the various elements.

Figure 2:
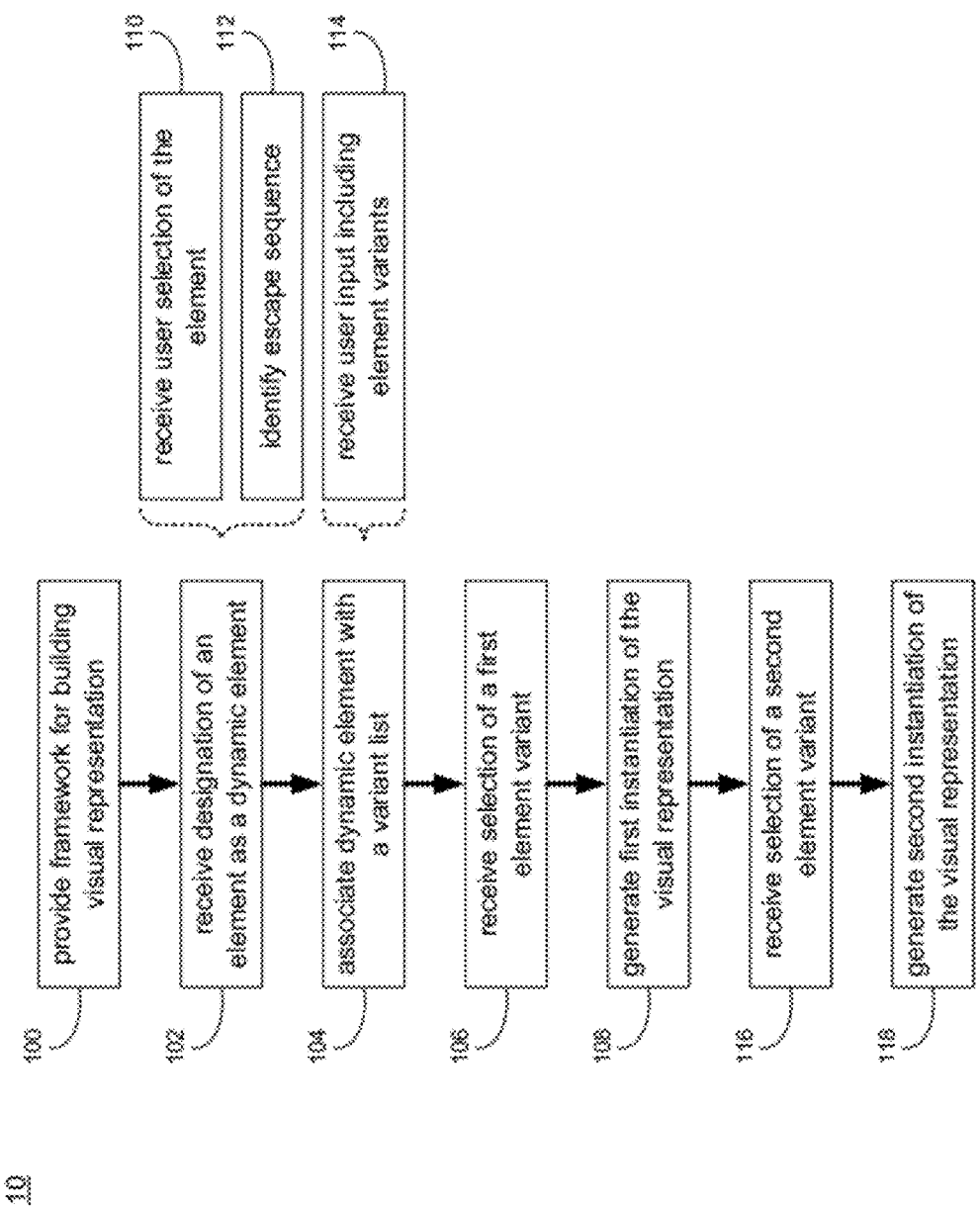
FIG. 2 is a flowchart of a process that may be executed by the concept development process of FIG. 1.

Referring also to FIG. 2, according to one aspect, concept development process 10 may provide 100 a framework for building a visual representation of a product concept. The visual representation may include one or more of a textual component and a graphical component. Concept development process 10 may also receive 102 a designation of an element within at least one of the textual component and the graphical components as a dynamic element. The dynamic element may be associated 104 with a variant list including one or more element variants. Concept development process 10 may receive 106 a selection of a first element variant from the variant list. Concept development process 10 may also generate 108 a first instantiation of the visual representation including the first element variant as the dynamic element.

Figure 3:
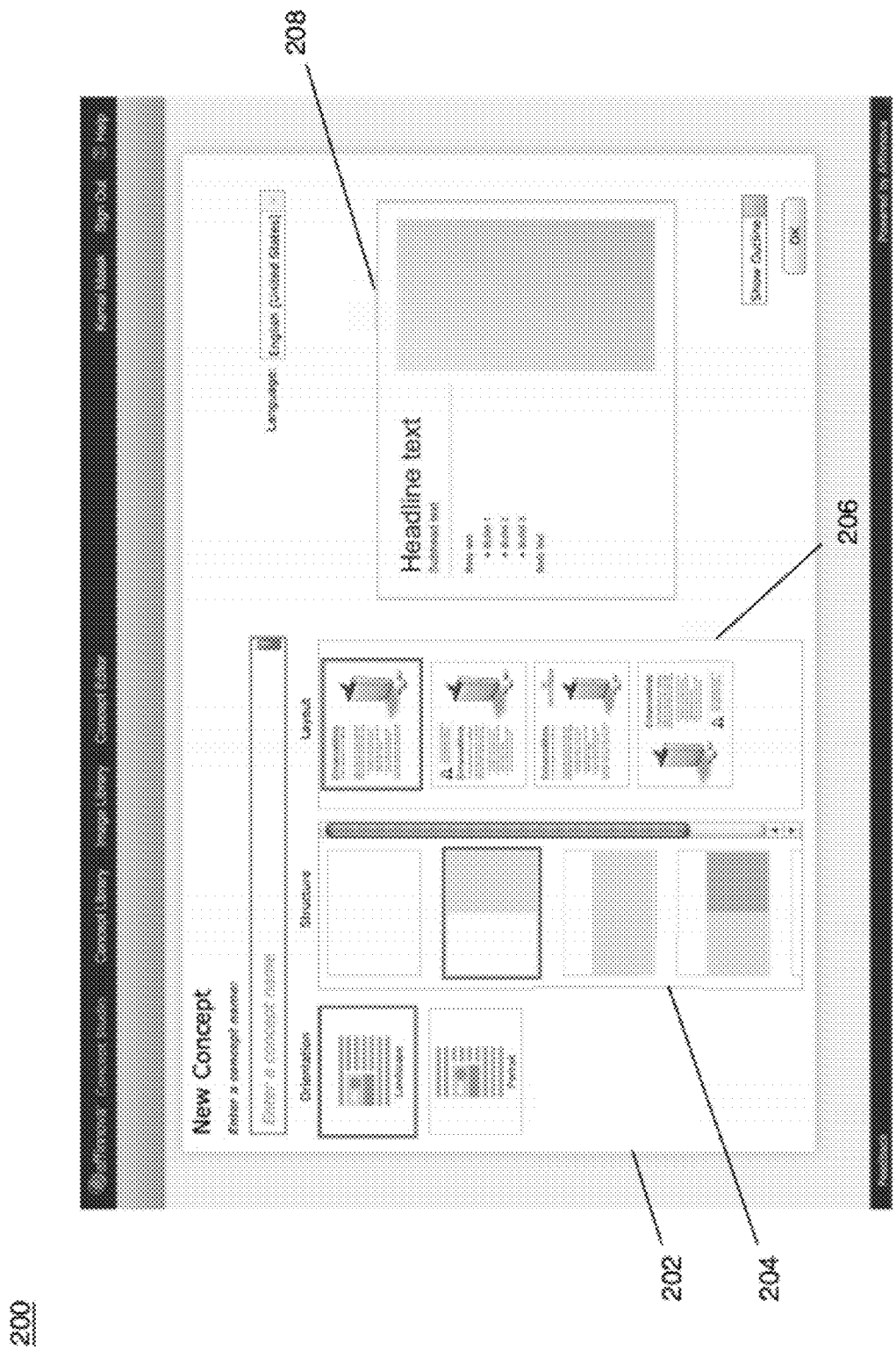
FIG. 3 graphically depicts a user interface that may be generated, at least in part, by the concept development process of FIG. 1.

A visual representation of a concept may, for example, be used to describe and communicate an idea, such as a new product or service concept. Referring also to FIG. 3, concept development process 10 may provide 100, a framework for developing a visual representation of a concept. For example, in an embodiment, concept development process 10 may, for example, allow a user (e.g., user 46) to select, via client application 22, a template upon which to build the visual representation. For example, concept development process may provide template selection interface 200. Template selection interface may allow user 46 to select various template attributes. For example, concept development process 10 may allow user to select (e.g., via an onscreen pointer controlled by a pointing device, such as a mouse; not shown) a visual representation orientation (e.g., from within frame 202), a general visual representation structure (e.g., from within frame 204) and a visual representation layout (e.g., from within frame 206). Further, concept development process 10 may provide preview 208 of the template for the visual representation. While template selection interface 200 has been shown including various template orientations, structures, and layouts, such features are intended for the purpose of illustration only, and should not be construed as a limitation on the present disclosure as other template selection interfaces, and features therein, may be equally utilized. In addition/as an alternative to the use of a template selection interface, the orientation, structure, and layout for the visual representation may be otherwise defined by the user, e.g., through the placement of text boxes and/or graphical components within an unconstrained framework. Further, in some embodiments, the user may utilize a previously constructed visual representation of a concept (either a related concept or an unrelated concept) that may be modified (in content and/or structure and/or layout) for the creating a new visual representation of a new concept.

Figure 4:
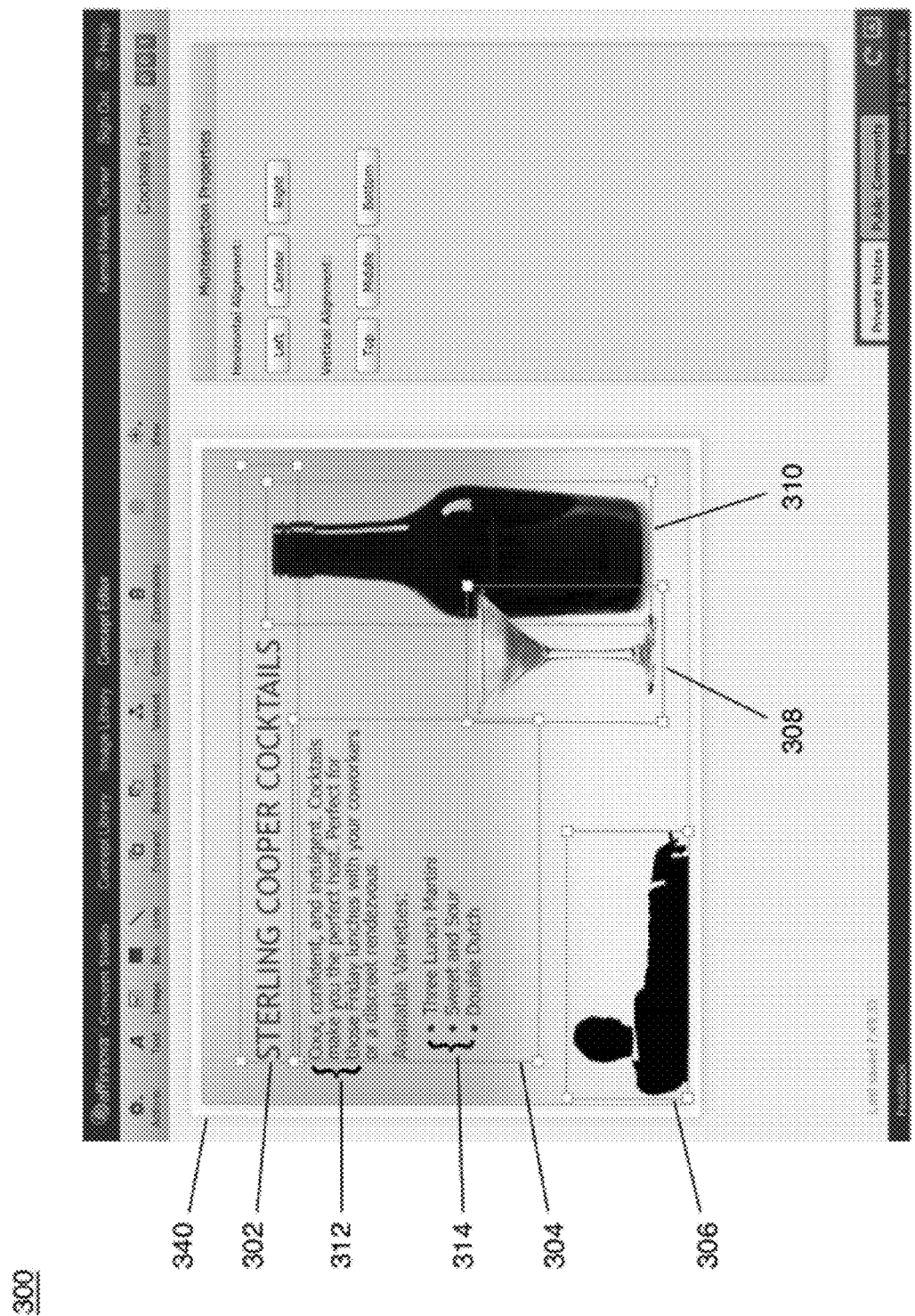
FIG. 4 graphically depicts a user interface that may be generated, at least in part, by the concept development process of FIG. 1.

Referring also to FIG. 4, in an example embodiment, visual representation user interface 300 for developing a visual representation 340 of a product concept may include one or more of a textual component (e.g., textual components 302, 304) and a graphical component (e.g., graphical components 306, 308, 310). Additionally, one or more of the textual components and/or graphical components may be further divided into subcomponents (e.g., textual component 304 may include subcomponents 312, 314). Concept generation process 10 may receive 102 a designation of an element within at least one of the textual components and the graphical components as a dynamic component. Element within at least one of the textual components and the graphical components may include a portion of a textual component or a graphical component, and/or the element may, in some embodiments, include the entirety of a textual component or a graphical component. For example, the element may include an image within a graphical component and/or may include one or more words (e.g., a word, a word fragment, and/or portions thereof, which may include one or more characters, symbols, and/or character/symbol strings, etc.).

In an embodiment, a dynamic element may include an element that may change. For example, the dynamic element may change to provide different content. Additionally/alternatively, the dynamic element may change to take a different content form (e.g., may change to replace a textual element with a graphical element, or may change to replace a graphical element with a textual element). Further, in some embodiments, the dynamic element may change to replace one of a textual element or a graphical element with a mixed element (e.g., an element including both text and graphics).

Receiving 102 the designation of the element may include receiving 110 a user selection of the element from within one or more of the textual component and the graphical component. For example, and referring also to FIG. 5, user 46 may wish to make a portion of the text within textual component 304 dynamic. Accordingly, user 46 may select the desired text that user 46 intends to designate as a dynamic element (e.g., element 316), for example, by highlighting the text using onscreen pointer 318. Further, user 46 may designate element 316 as being a dynamic element, e.g., by selecting variant button 320 from within the menu bar. In additional/alternative embodiments, user 46 may designate element 316 as being a dynamic element by right-clicking on highlighted element 316, e.g., which may result in concept development process rendering a pop-up, or other user interface (not shown), which may provide the option to designate the selected element as being a dynamic element.

In an embodiment, receiving 102 the designation of the element may include identifying 112 an escape sequence within one or more of the textual component and the graphical component. For example, and referring still to FIG. 5, user 46 may replace (e.g., via text editing functionality provided by concept development process 10) the text "Cool confident and indulgent. Cocktails make you the perfect host" with an escape sequence (e.g., $Text Element A$; not shown). Additionally/alternatively, during creation of textual component 304, rather than providing the text "Cool confident and indulgent. Cocktails make you the perfect host," user 46 may provide (e.g. input via client application 22) the escape sequence. Concept development process 10 may identify 112 the escape sequence $Text Element A$ as being an indication of a dynamic element having an identifier "Text Element A." In response to identifying 112 the escape sequence, concept development process 10 may receive 102 a designation of the escape sequence as a dynamic element.

Concept development process 10 may associate 104 the dynamic element with a variant list including one or more element variants. For example, concept development process 10 may generate a list (e.g., list interface 322 in visual representation interface 300). Concept development process 10 may link the list to dynamic element 316 in visual representation interface 300. In an embodiment, the list (e.g., represented in list interface 322) may include an identifier of the dynamic element (e.g., dynamic element name 324, "Text Element A"). The list may include one or more element variants (e.g., elements that may be utilized as the dynamic element in a visual representation of the design concept).

In an embodiment, associating 104 the dynamic element with the variant list may include receiving 114 a user input including the one or more element variants. In an embodiment in which user 46 may select an element from within visual representation interface 300 as dynamic element 316, concept development process 10 may provide the selected element as first element variant 326 (namely "Cool, confident, and indulgent. Cocktails make you the perfect host," in the illustrated example). In an embodiment in which user 46 may provide an escape sequence that may be identified 112 by concept development process 10, concept development process 10 may provide an input field that may allow user 46 to define one or more element variants that may be utilized as dynamic element 316.

In an embodiment, concept development process 10 may provide an interface (e.g., input field 328) through which user 46 may input one or more additional element variants. In response to user 46 entering an element variant into input field 328 and selecting add button 330, concept development process 10 may receive 114 the user input including the additional element variants, and may include the additional element variants in the associated 104 list. For example, and referring also to FIG. 6, list 322 associated 104 with dynamic element 316 may include a plurality of element variants (e.g., element variants 326, 332, 334, 336). In addition/as an alternative to inputting individual element variants, in some embodiments, a link to a spreadsheet (which may include textual component, links to graphical components, or the like), CSV file (which may include textual component, links to graphical components, or the like), image url's, etc. may be provided (e.g., input into input field 328). In response to inputting a link or other reference, concept development process may import element variants associated with a link or referenced file, and may add such element variants to the variant list.

Figure 5:
FIG. 5 graphically depicts a user interface that may be generated, at least in part, by the concept development process of FIG. 1.

Concept development process 10 may receive 106 a selection of a first element variant from the list. For example, as shown in FIG. 5, element variant 326 may be selected by user 46, e.g., by selecting, via onscreen pointer 318, bullet 338 associated with element variant 326 in list 322. In addition/as an alternative to receiving 106 a selection based on a user input, concept development process 10 may receive a selection of a first element variant from the variant list based on one or more configuration settings and/or rules. For example, a configuration setting may include a random selection of a first element variant from the variant list. In another example, a configuration setting may include a selection of the first element variant added to the variant list, the last element variant added to the variant list, or other element variant included on the list. Various additional/alternative configuration settings and/or rules may be implemented for selection of the first element variant that may be received 106 by concept development process. One or more of the configuration setting and/or rules may be invoked, e.g., based on a user selection, e.g., for a random selection, or other similar invocation.

In response to receiving 106 the selection of the first element variant from list 322, concept development process 10 may generate 108 a first instantiation of the visual representation 340. First instantiation of the visual representation 340 may include the first element variant (i.e., "Cool, confident, and indulgent. Cocktails make you the perfect host," in the illustrated embodiment) as the dynamic element.

Figure 6:
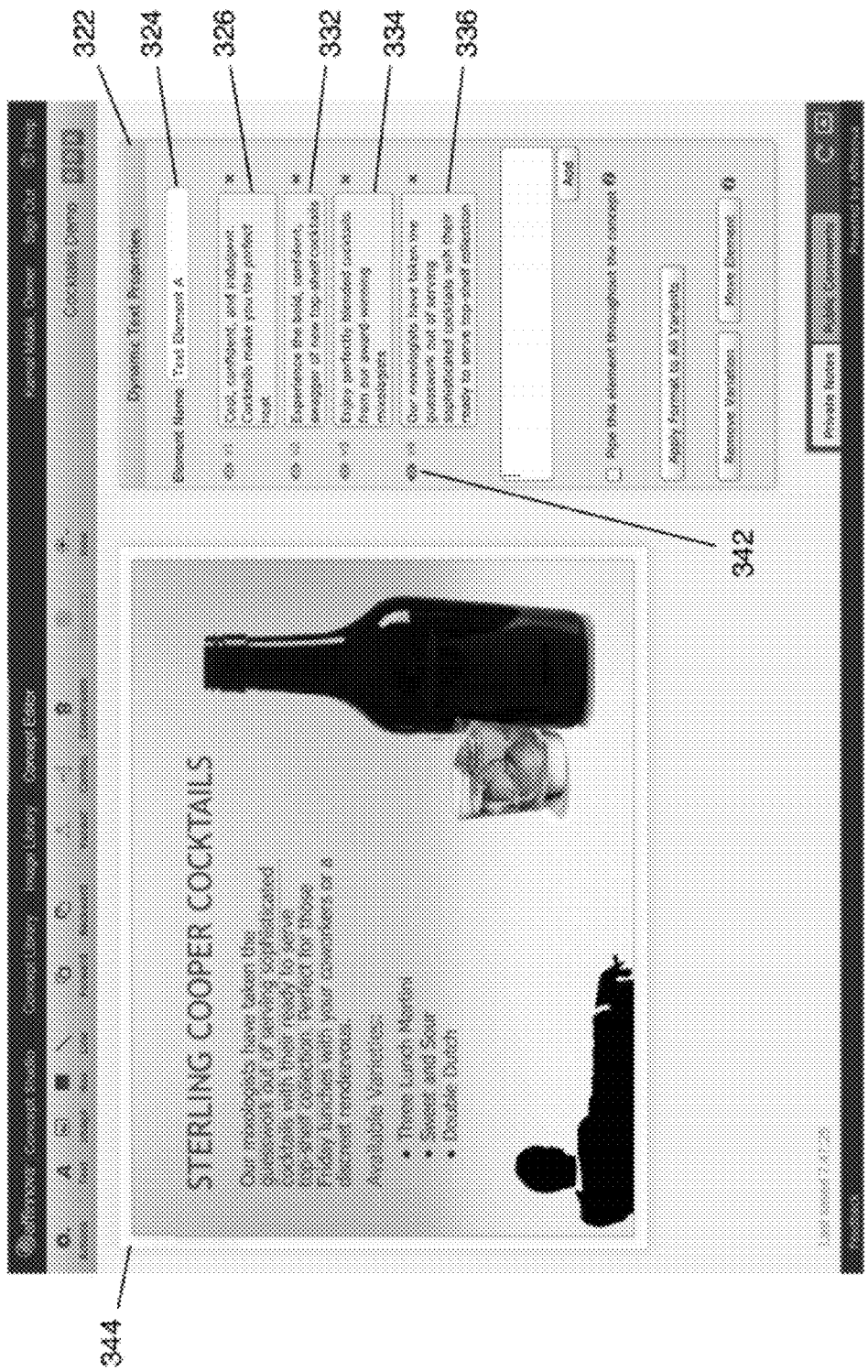
FIG. 6 graphically depicts a user interface that may be generated, at least in part, by the concept development process of FIG. 1.

In an embodiment, concept development process 10 may receive 116 a selection of a second element variant from list 322. For example, as shown in FIG. 6, user 46 may select, via onscreen pointer 318, bullet 342 associated with element variant 336 (i.e., "Our mixologists have taken the guesswork out of serving sophisticated cocktails with their ready to serve top-shelf collection") from list 322. In response to user 46 selecting bullet 342, concept development process 10 may generate 118 a second instantiation of the visual representation 344, shown in FIG. 6. Second instantiation of the visual representation 344 may include the second element variant (i.e., "Our mixologists have taken the guesswork out of serving sophisticated cocktails with their ready to server top-shelf collection") as the dynamic element.

Consistent with the foregoing, in an embodiment, the concept development process may allow an element within a visual representation of a concept to be designated as a dynamic element. The concept development process may further associate a list of element variants with the dynamic element. The list of element variants may include one, or more than one, element variants. The concept development process may further allow different element variants to be utilized as the dynamic element in various instantiations of the visual representation of the concept, e.g., in response to receiving a selection of an element variant. For example, in response to a user selecting a desired element variant, the concept development process may automatically generate an instantiation of the visual representation of the concept, in which the selected element variant may be utilized as the dynamic element for the purposes of the instantiation of the visual representation. As such, it may be possible for the user to create multiple different instantiations of visual representation of the concept, including different element variants, without having to manually revise the visual representation.

In some embodiments, it may be desirable to suppress the appearance of certain element variants together in a single concept representation. For example, combinations of elements variants may not be desirable to be shown to decision makers or to potential consumers, for different reasons. For example, in a frozen dinner concept, a product form that consists of a metallic pan should not be shown with "Microwavable" as a feature, due to physical incompatibility. Similarly, an "All natural" benefit statement may not desirably appear with "Sweetened with aspartame" as an ingredient, e.g., for legal reasons. As a further example, certain combinations of elements such as expensive packaging and expensive ingredients may result in the production cost exceeding a certain limit. Accordingly, it may be desirable to limit such combinations and/or identify such combinations. In and example embodiment, concept development process 10 may provide the ability to establish constraints that may prevent and/or identify combinations of elements that may be undesired.

Figure 7:
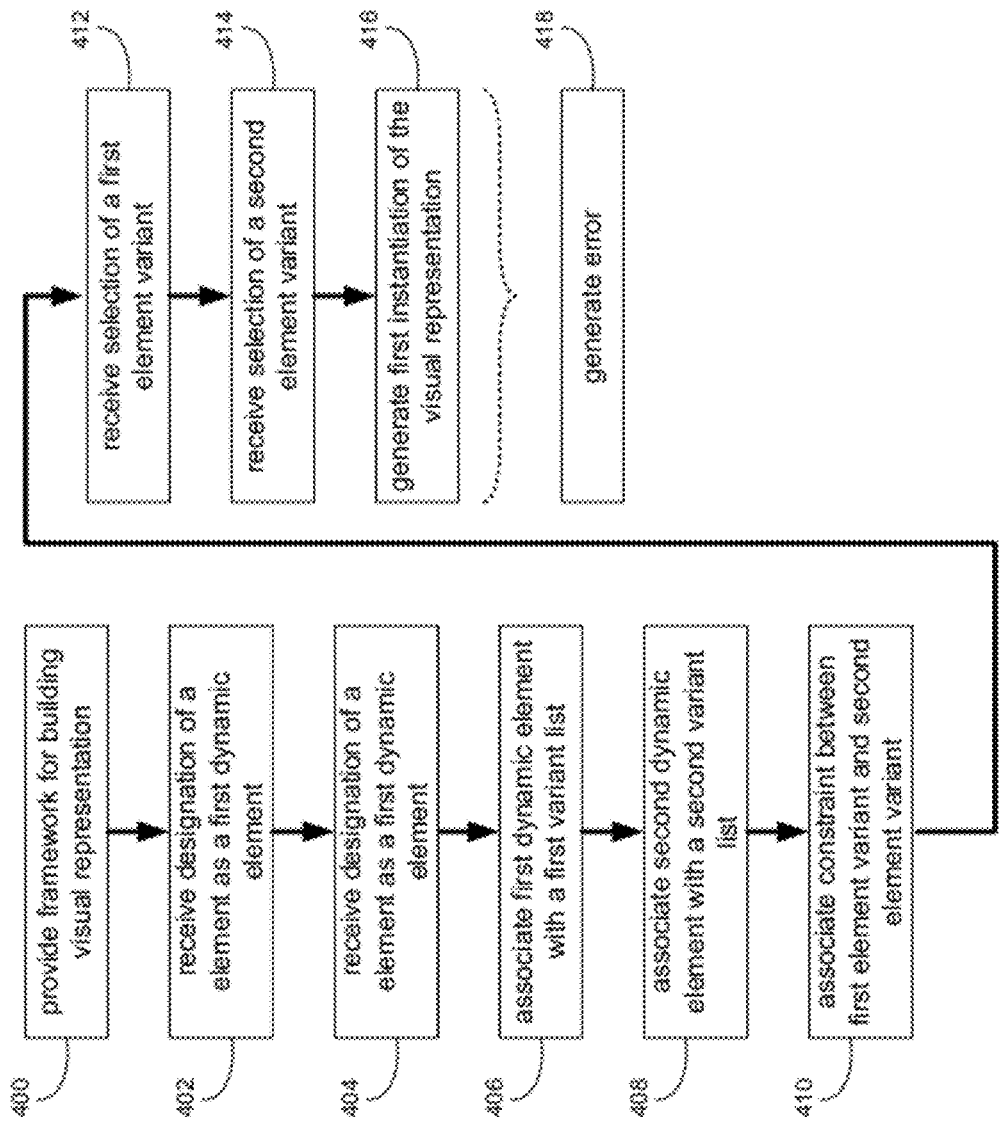
FIG. 7 is a flowchart of a process that may be executed by the concept development process of FIG. 1.

Referring also to FIG. 7, according to one aspect, concept development process 10 may provide 400 a framework for building a visual representation of a product concept. The visual representation may include one or more of a textual component and a graphical component. Concept development process 10 may also receive 402 a designation of a first element within at least one of the textual component and the graphical components as a first dynamic element. Concept development process 10 may receive 404 a designation of a second element within at least one of the textual component and the graphical component as a second dynamic element. Concept development process 10 may associate 406 the first dynamic element with a first variant list including one or more first element variants. Concept development process 10 may also associate 408 the second dynamic element with a second variant list including one or more second element variants. Concept development process 10 may associate 410 a constraint between at least one of the one or more first element variants and at least one of the one or more second element variants. In some embodiments, the first dynamic element and the second dynamic element may include the same element. In such an embodiment, the constraint may be associated between two or more element variants associated with the same dynamic element, e.g., as may be the case of a combination dynamic element, in which a single dynamic element may be replaced by a plurality of element variants. Concept development process 10 may receive 412 a selection of a first element variant from the first variant list. Concept development process 10 may also receive 414 a selection of a second element variant from the second variant list. A first instantiation of the visual representation may be generated including the first element variant as the first dynamic element and the second element variant as the second dynamic element based upon the constraint.

Figure 8:
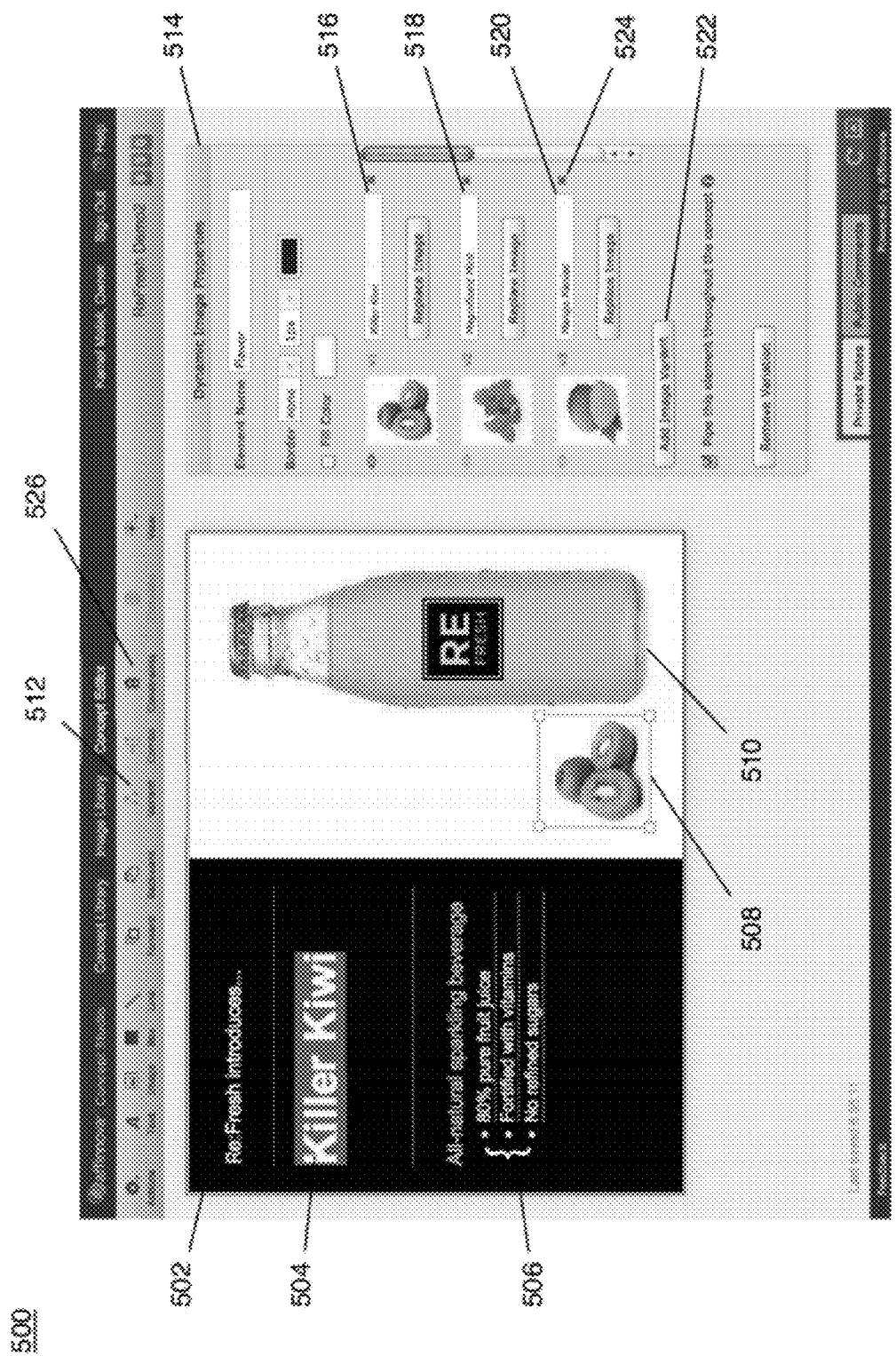
FIG. 8 graphically depicts a user interface that may be generated, at least in part, by the concept development process of FIG. 1.

For example, and referring also to FIG. 8, concept development process 10 may provide 400 a framework for building a visual representation of a product concept. The framework for building the visual representation of the product concept may include visual representation user interface 500 for developing a visual representation 502 of a product concept. The visual representation 502 of the product concept may include one or more of a textual component (e.g., textual components 504, 506) and a graphical component (e.g., graphical components 508, 510). For example, in the illustrated embodiment, textual component 504 may include a product name, and textual component 506 may include product attributes. Similarly, in the illustrated embodiment, graphical component 508 may include a graphical product attribute (e.g., a graphical representation of an ingredient), and graphical component 510 may include a depiction of the product. Various additional/alternative textual and/or graphical components may also be included, depending upon product and product concept.

Concept development process 10 may receive 402 a designation of a first element within at least one of the textual components and the graphical components as a first dynamic element. For example, in a manner generally analogous to that described with reference to FIGS. 4 through 6, a user (e.g., user 46) may select a textual element (e.g., textual element 506) using an onscreen pointer (not shown) controlled by an input device, such as a mouse (not shown). User 46 may further select variant button 512 from a toolbar associated with visual representation user interface 500. In response to user 46 selecting variant button 512, concept development process 10 may receive 402 a designation of textual component 506 as a dynamic element. In various additional/alternative embodiments, the concept development process may receive the designation of the textual element as a dynamic element in response to, e.g., a pop-up interface, or other suitable interface. Further, in some embodiments, the concept development process may receive the designation of the textual element as a dynamic element in response to identifying an escape sequence.

Similarly, concept development process 10 may receive 404 a designation of a second element within at least one of the textual component and the graphical component as a second dynamic element. For example, in a similar manner as described above, user 46 may select graphical element 508 using onscreen pointer (not shown). User 46 may further select variant button 512 from the toolbar associated with visual representation user interface 500. In response to user 46 selecting variant button 512, concept development process 10 may receive 404 a designation of graphical element 508 as a dynamic element. In various additional/alternative embodiments, the concept development process may receive the designation of the graphical element as a dynamic element in response to, e.g., a pop-up interface, or other suitable interface. Further, in some embodiments, the concept development process may receive the designation of the graphical element as a dynamic element in response to identifying an escape sequence.

Concept development process 10 may associate 406 the first dynamic element with a first variant list including one or more first element variants. Further, and in a generally similar manner, concept development process 10 may also associate 408 the second dynamic element with a second variant list including one or more second element variants. For example, and with continued reference to FIG. 8, upon receiving a designation of graphical element 508 as the second dynamic element, concept development process 10 may render variant panel 514. As shown, variant panel may include an identifier associated with the second dynamic element (e.g., "Flavor," in the illustrated example). Further, panel 514 may include a second variant list including one or more second element variants (e.g., second element variants 516, 518, 520). In the illustrated embodiment, the second variant list may be populated (e.g., second element variants may be added and/or removed from the second variant list) by user 46 selecting (e.g., using the onscreen pointer) "add image variant" button 522 (in the case of a graphical dynamic element). Upon selecting "add image variant" button 522, concept development process 10 may enable user 46 to add a second element variant. For example, concept development process 10 may enable user 46 to input an element variant (e.g., an image in the instance of a graphical dynamic element, for example by selecting an image file and/or creating an image using an image editing application, not shown), add element variant properties (e.g., an element variant identifier), and the like. Similarly, concept development process 10 may enable user 46 to remove an element variant from the variant list, e.g., by selecting (e.g., using the onscreen pointer) a remove button (e.g., "x" icon 524) associated with one or more of the element variants (e.g., element variant "Mango Maniac," in the illustrated embodiment). In response to user 46 selecting remove button 524, concept development process may remove the selected element variant from the variant list.

In an additional/alternative embodiment, a user may provide a link, address, or other reference to a file or location including one or more element variants and/or a variant list. Concept development process 10 may add the one or more element variants to the variant list, and/or may import and/or otherwise associate the dynamic element with the one or more element variants and/or the variant list. An example of a file including one or more textual element variants may include a spreadsheet file, a CSV file, or other similar file. Similarly, an example of a reference that may be used for importing one or more graphical element variants may include, e.g., one or more image url's and associated variant names. In some embodiments, one or more image url's and/or image names may be included within a spreadsheet, CSV file, or the like. Concept development process 10 may associate 406 the first dynamic element with a first variant list including one or more first element variants in a similar manner as described with respect to the second dynamic element.

Figure 9:
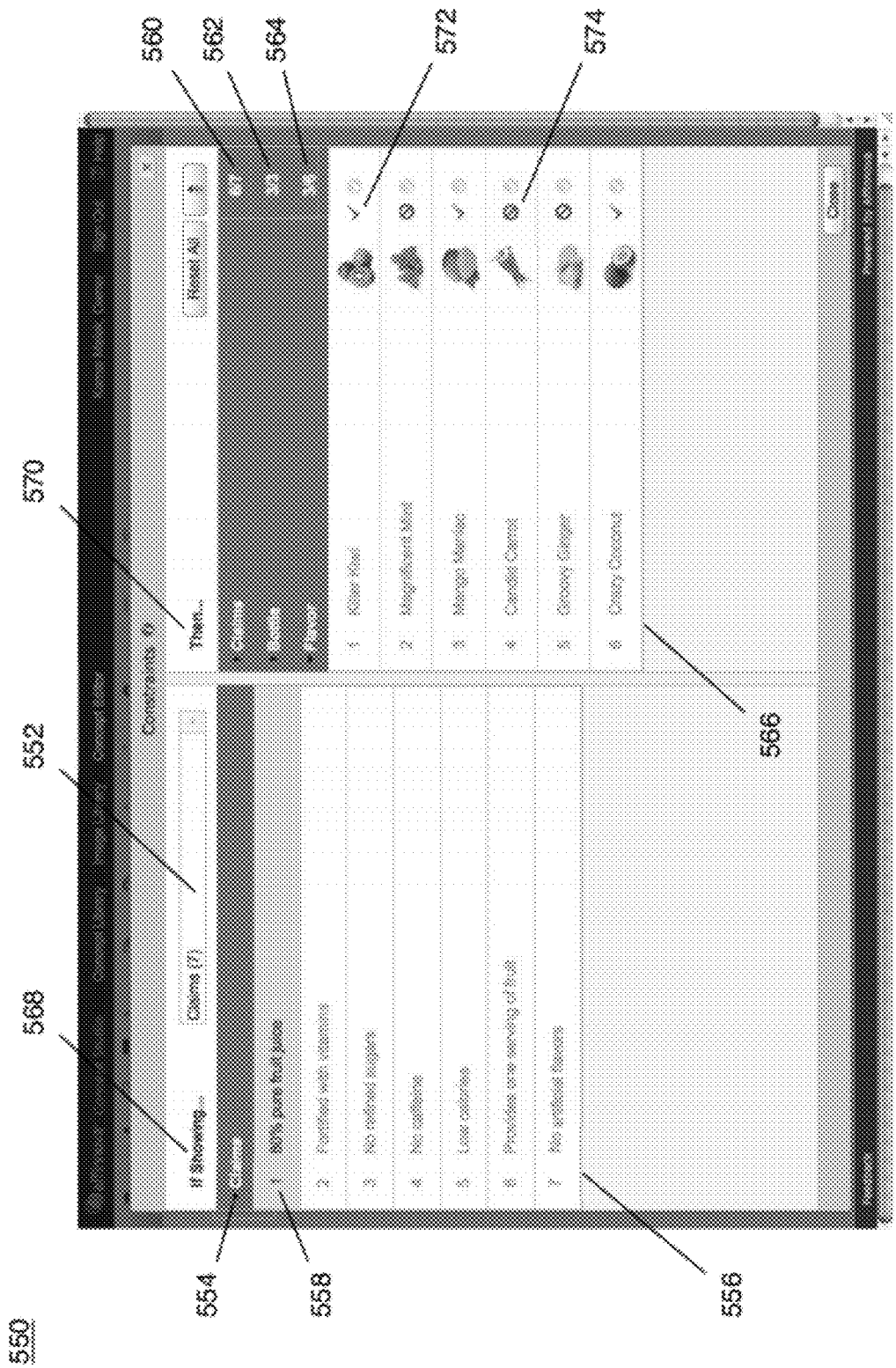
FIG. 9 graphically depicts a user interface that may be generated, at least in part, by the concept development process of FIG. 1.

Concept development process 10 may associate 410 a constraint between at least one of the one or more first element variants and at least one of the one or more second element variants. For example, in an example embodiment, from within visual representation user interface 500, user 46 may select "constraints" button 526 from the toolbar. In response to user 46 selecting "constraints" button 526, and referring also to FIG. 9, concept development process 10 may render user interface 550. User interface 550 may include, for example a pop-up window, a new display, or other suitable interface. In the illustrated example, user interface 550 may display a selection option, such as pull-down menu 552, e.g., which may allow user 46 to select a first dynamic element. In the illustrated embodiment, user 46 may have selected the first dynamic element. In an additional/alternative embodiment, concept development process 10 may present, by default and/or based on one or more configuration rules and/or preferences, one of the dynamic. For example, based on one or more rules, concept development process 10 may present the last element selected from within visual representation 502 as the first dynamic element.

As shown, user interface 550 may further include identifier 554 of the displayed dynamic element (e.g., "claims" in the illustrated embodiment). Further, user interface 550 may include a variant list (e.g., first variant list 556) that may include the one or more first element variants. User 46 may select a one of the first element variants e.g., by clicking on one of the first element variants (for example first element variant 558 "80% pure fruit juice, has been selected in the illustrated example). Further, user interface 550 may include an identifier of one or more additional dynamic elements (e.g., identifier of dynamic elements 560, 562, 564). User 46 may select (e.g., via an onscreen pointer) an identifier associated with one or the additional dynamic elements. For example, user 46 may select identifier 564 (e.g., "flavor" in the illustrated embodiment). Upon selecting identifier 564, concept development process 10 may provide second variant list 566, e.g., which may include the one or more second element variants. Additionally/alternatively, one or more additional dynamic variant lists may be provided by default, e.g., based on configuration rule, preference setting, based on user selection and/or activities within visual representation 502, or the like.

In an embodiment, the constraint may include a prohibitory constraint. For example, the prohibitory constraint may designate one or more second element variants as being incompatible and/or undesirable in combination with selected first element variant. Additionally/alternatively, the constraint may include a permissive constraint. For example, the permissive constraint may designate one or more second element variants as desirable and/or required in combination with the selected first element variant. In an embodiment, user interface 550 may include indicators 568, 570 indicating the type or form of constraint in use. For example, in the illustrated embodiment, indicators 568, 570 may indicate a logical "if showing X then Y is allowed/prohibited" constraint form. Another logical constraint form may include "if showing X then must show Y".

The constraints, either prohibitory or permissive, may be based on one of a business rule, a logical rule or an algebraic rule. For example, a prohibitory business rule may prevent a combination that may be monetarily undesirable (e.g., the combination of variants may result in a higher cost than desired), legally undesirable (e.g., a combination such as "all natural" and "sweetened with aspartame"), or otherwise be undesirable for business reasons. An example of a logical rule may include, for example, an indication of strawberry flavoring in combination with a picture of a pineapple. An example, of an algebraic rule may include, for example, an indication of a $29.99 price in combination with a indicator of "three easy payments of $19.99." The foregoing examples of business, logical, and algebraic rules are intended only for the purpose of illustration, and not of limitation. Various additional and/or alternative bases for constraints will be readily appreciated.

In an embodiment, concept development process 10 may receive an indicator of constraints associated between two or more element variants. For example, via user interface 550 user 46 may set a constraint (e.g., a prohibitory constrain in the illustrated embodiment) between selected first element variant 558 and one or more second element variants from within the second variant list. As shown each second element variant may include an indicator (e.g., indicator 572, 574) indicating whether a combination is prohibited or allowed. User 46 may select, via an onscreen pointer, one or more toggle button 572,574 to toggle a constraint for a given second element variant between prohibited and allowed. For example, in the illustrated embodiment a prohibitory constraint may be associated between the first element variant "80% pure fruit juice" and each of the second element variants "Magnificent Mint," "Candid Carrot," and "Groovy Ginger," e.g., based on a user selection of a constraint toggle button associated with each of the second element variants. Similarly, a non-prohibitory constraint (and/or no constraint) may be associated between the first element variant "80"% pure fruit juice" and each of the second element variants "Killer Kiwi," "Mango Maniac," and "Crazy Coconut," e.g., based on a user selection of a toggle button associated with each of the second element variants.

In some embodiments, in the case of a prohibitory constrain each of the second element variants may be prohibited or allowed by default (e.g., based on configuration rule, preference, etc.). Correspondingly, in some embodiments, in the case of a permissive constraint each of the second element variants may be required or not required by default. Various additional/alternative implementations may be equally utilized. Accordingly, a default constraint may be established between one or more first element variants and one or more second element variants. Concept development process 10 may receive an indicator of constraints based on user selection and/or default constraints associated between two or more variant elements.

Concept development process 10 may receive 412 a selection of a first element variant from the first variant list. Additionally, concept development process 10 may also receive 414 a selection of a second element variant from the second variant list. For example, in a similar manner as discussed with reference to FIG. 6, a first element variant may be selected from the first variant list and a second element variant may be selected from the second variant list. Selection of the first element variant and/or the second element variant may be based on a user selection of an element variant from within the first variant list and/or the second variant list. In response to a user selection of a first element variant and/or a second element variant, concept development process 10 may receive 412, 414 the selection of the first element variant and/or the second element variant. In addition/as an alternative to receiving 412, 414 a selection of a first element variant and/or a second element variant in response to a user selection, concept development process 10 may receive a selection of a first element variant based on a configuration rule, preference setting, or the like. For example, concept development process 10 may receive 412, 414, a selection of the first element variant and/or the second element variant based on random selection of a first element variant from within first variant list, based on an element variant attribute (e.g., textually and/or graphically largest element variant; order in which the element variants were added to the variant list, etc.), and/or otherwise selected.

In response to receiving 412, 414 a selection of a first element variant and a second element variant, concept development process 10 may generate 416 a first instantiation of the visual representation including the first element variant as the first dynamic element and the second element variant as the second dynamic element based upon the constraint (e.g., the first instantiation of the visual representation may take into account any constraints between the first dynamic element and the second dynamic element. For example, and referring also to FIG. 10, "80% natural fruit juice" may have been selected as the first element variant, and a mint leaf graphical may have been selected as the second element variant. Accordingly user interface 600 may include first instantiation 602 of the visual representation of the product concept including, in part, "80% natural fruit juice" as first dynamic element 506, and a graphical of mint leaves as second dynamic element 508.

Figure 10:
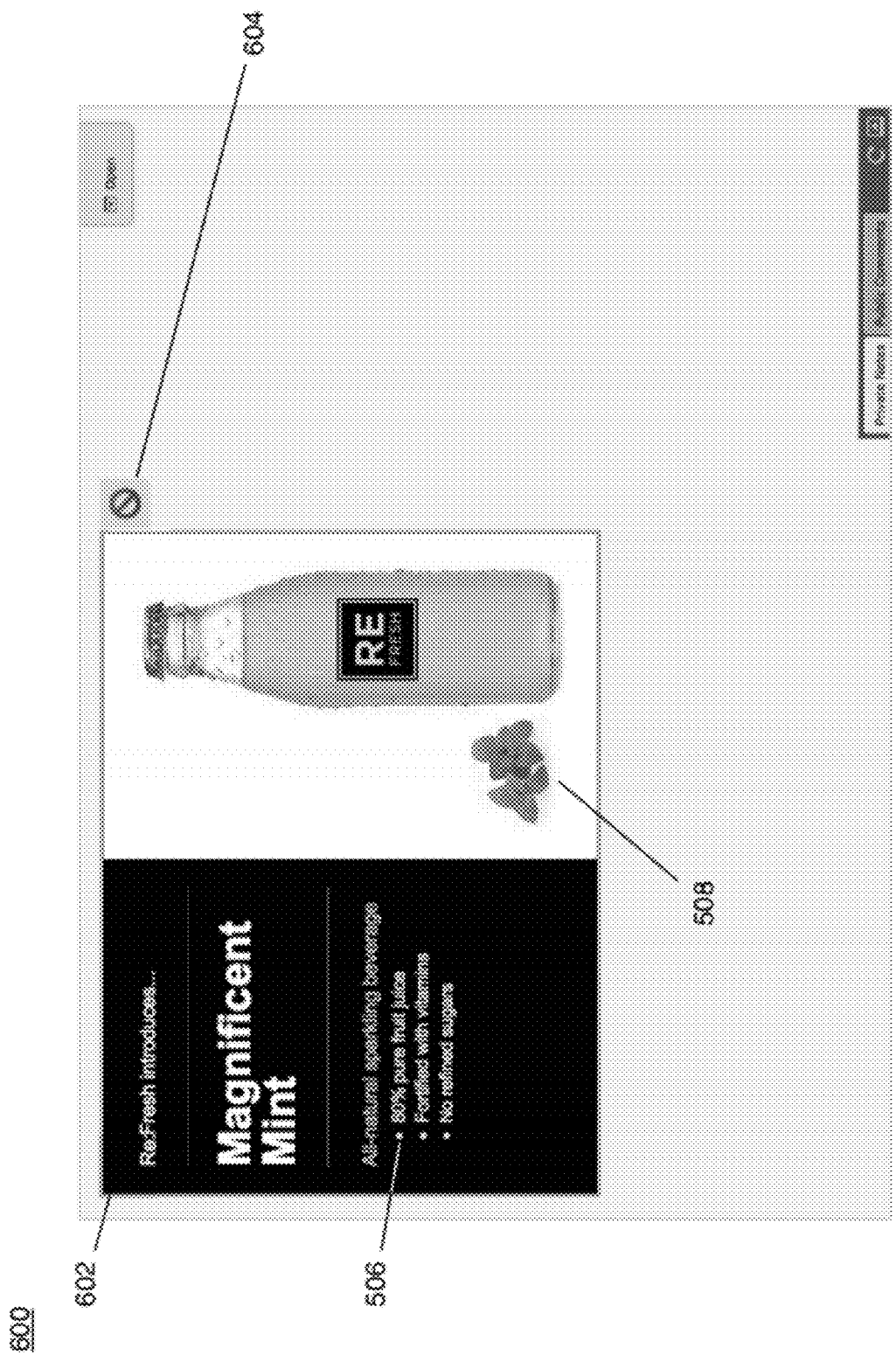
FIG. 10 graphically depicts a user interface that may be generated, at least in part, by the concept development process of FIG. 1.

As discussed above with reference to FIG. 9, a prohibitory constraint may be associated between the first element variant "80% natural fruit juice" and the second element variant "Magnificent Mint" (e.g., including a displayed second element variant including a mint leaf graphical). Accordingly, and referring also to FIG. 10, in an embodiment, generating 416 first instantiation 602 of the visual representation based on the constraint may include generation 418 an error based on the constraint. In an embodiment, generating 418 the error may include providing a visual warning. For example, as shown in FIG. 10, first instantiation 602 of the visual representation may include prohibition symbol 604.

In an embodiment, the error may include an identification of the constraint violation. For example, while not shown, the first instantiation of the visual representation of the product concept may include an indicator of the first dynamic element and the second dynamic element, e.g., via a graphical indicator such as highlighting, display of an error symbol (e.g., a red "X", etc.) in place of the first dynamic element and the second dynamic element, and/or otherwise identifying the constraint violation. Additionally/alternatively, the warning may include an identification of the constraint. For example, the first instantiation of the visual representation may include a pop-up including the first element variant and the second element variant and the violated constraint. In some embodiments, the first instantiation of the visual representation may include a natural language explanation of the violation (e.g., "combination of 80% pure fruit juice and Magnificent Mint is not permitted"). In still further embodiments, the warning may include a suggestion of an alternate second element variant, e.g., based on constraints associated between the first element variant and one or more second element variants. In some embodiments, in the event of a constraint violation, generating 416 the first instantiation of the visual representation based on the constraint may include a failure to generate a visual representation of the product concept.

In some embodiments, constraints may be associated between element variants within one of the first variant list and the second variant list. That is, constraints may be associated between element variants within the same variant list, rather than between element variants from different variant lists. For example, in some embodiments, each of the first dynamic element and the second dynamic element may be associated with the same variant list. In such an embodiment, an instantiation of the visual representation may include one or more dynamic elements that may provide one or more element variants from the same variant list. Constraints may be associated between element variants of the same variant list. For example, a constraint may require that if a dynamic element include a first element variant, then another dynamic element must include one, or more than one, specific second element variant from the variant list. In a related manner, a constraint may require that if a dynamic element includes a first element variant from the variant list, another dynamic element cannot include one, or more than one, specific second element variant from the variant list.

In some embodiments, it may be desirable to provide a product under development one or more elements that may include a set of constituents or sub-elements. For example, in the case of a food product, an element of the product under design may include a list of available flavors, in which each of the available flavors may be a sub-element of the element flavors. By way of further example, a product under development may include a list of features or benefits the proposed product claims to deliver. In such an embodiment, it may be desirable to generate and assess product representations including different combinations of such features or benefits. Consistent with the foregoing, in some embodiments, it may be desirable to provide one or more visual representations of a product concept including an element having different combinations of sub-elements. According to one embodiment, concept development process 10 may facilitate providing different visual representations of a product concept including an element having different combinations of sub-elements.

Figure 11:
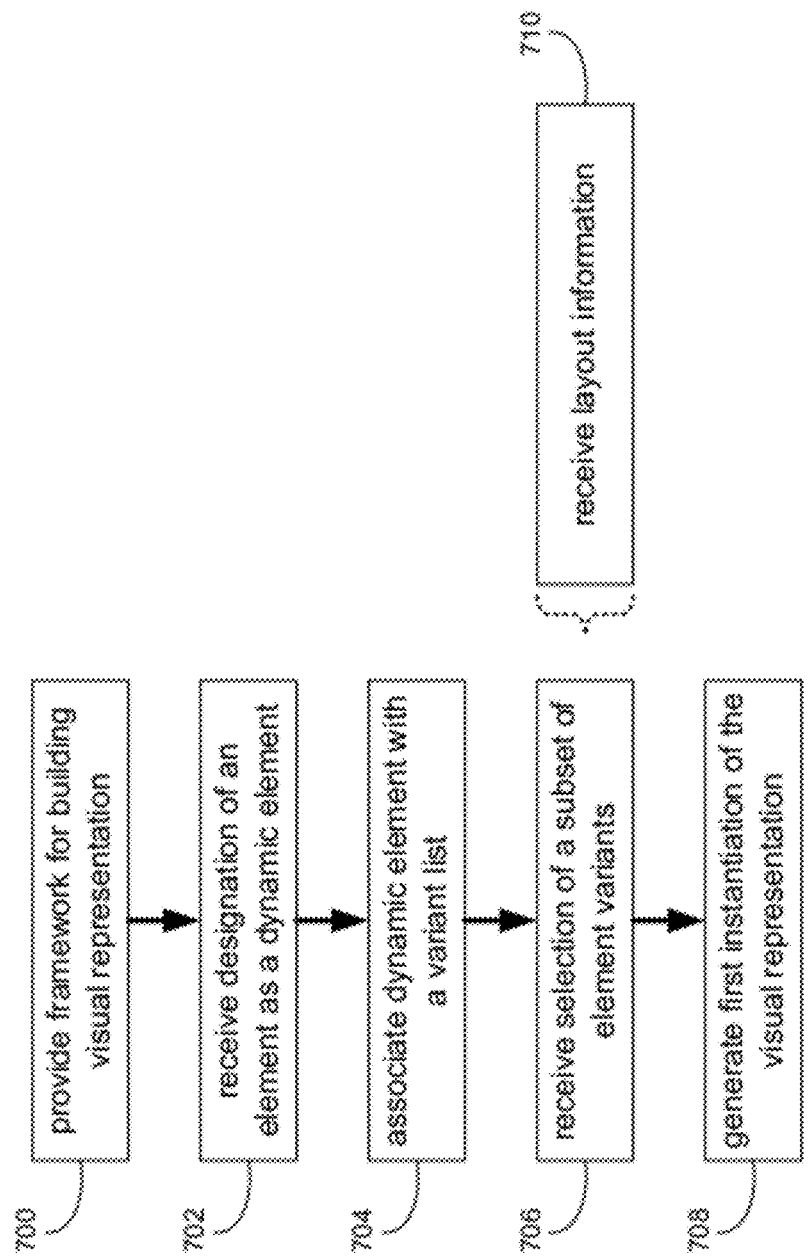
FIG. 11 is a flow chart of a process that may be executed by the concept development process of FIG. 1.

In one embodiment, and with reference to FIG. 11, concept development process 10 may provide 700 a framework for building a visual representation of a product concept. The visual representation may include one or more of a textual component and a graphical component. Concept development process 10 may receive 702 a designation of an element within at least one of the textual component and the graphical component as a dynamic element. The dynamic element may be associated 704 with a variant list including a plurality of element variants. Concept development process may further receive 706 a selection of a subset of the plurality of element variants from the variant list. Concept development process 10 may also generate 708 a first instantiation of the visual representation including the subset of the plurality of element variants as the dynamic element.

Figure 12:
FIG. 12 graphically depicts a user interface that may be generated, at least in part, by the concept development process of FIG. 1.

For example, and referring to FIG. 12, concept development process 10 may provide 700 a framework for building a visual representation of a product concept. The framework for building the visual representation of the product concept may include visual representation user interface 750 for developing visual representation 752 of the product concept. Visual representation 752 may include one or more of a textual component (e.g., textual components 754, 756) and a graphical component (e.g., graphical component 758). In the illustrated example, textual component 756 may include, in part, a bulleted list of available varieties (namely, "Three Lunch Martini," "Three's Company," and "Sweet and Sour").

Concept development process 10 may receive 702 a designation of an element within at least one of the textual component and the graphical components as a dynamic element. For example, an in a manner similar to that described above, a user (e.g., user 46) may select a textual element (e.g., textual element 760 including the items "Three's Company," and "Sweet and Sour") from textual component 756 using onscreen pointer 762 (e.g., which may be controlled by an input device). User 46 may further select "combo" button 764 (e.g. using onscreen pointer 762) from a toolbar associated with visual representation user interface 750. In response to user 46 selecting combo button 764, concept development process 10 may receive 702 a designation of textual element 760 within textual component 756 as being a dynamic element that may allow substitution of the single dynamic element by a plurality of element variants. Consistent with the illustrated example in which textual element 760 may include two bulleted items (i.e., "Three's Company," and "Sweet and Sour"), concept development process 10 may receive 702 a designation of the two bulleted items as being a single dynamic element, as being two dynamic elements, and/or as being a single dynamic element including two or more discrete sub-elements. Further, in such an embodiment, concept development process 10 may not receive a designation of the first item of the bulleted list (i.e., "Three Lunch Martini") as being a dynamic element. In various additional/alternative embodiments, the concept development process may receive the designation of the textual element as a dynamic element in response to, e.g., a pop-up interface, or other suitable interface. Further, in some embodiments, the concept development process may receive the designation of the textual element as a dynamic element in response to identifying an escape sequence.

Figure 13:
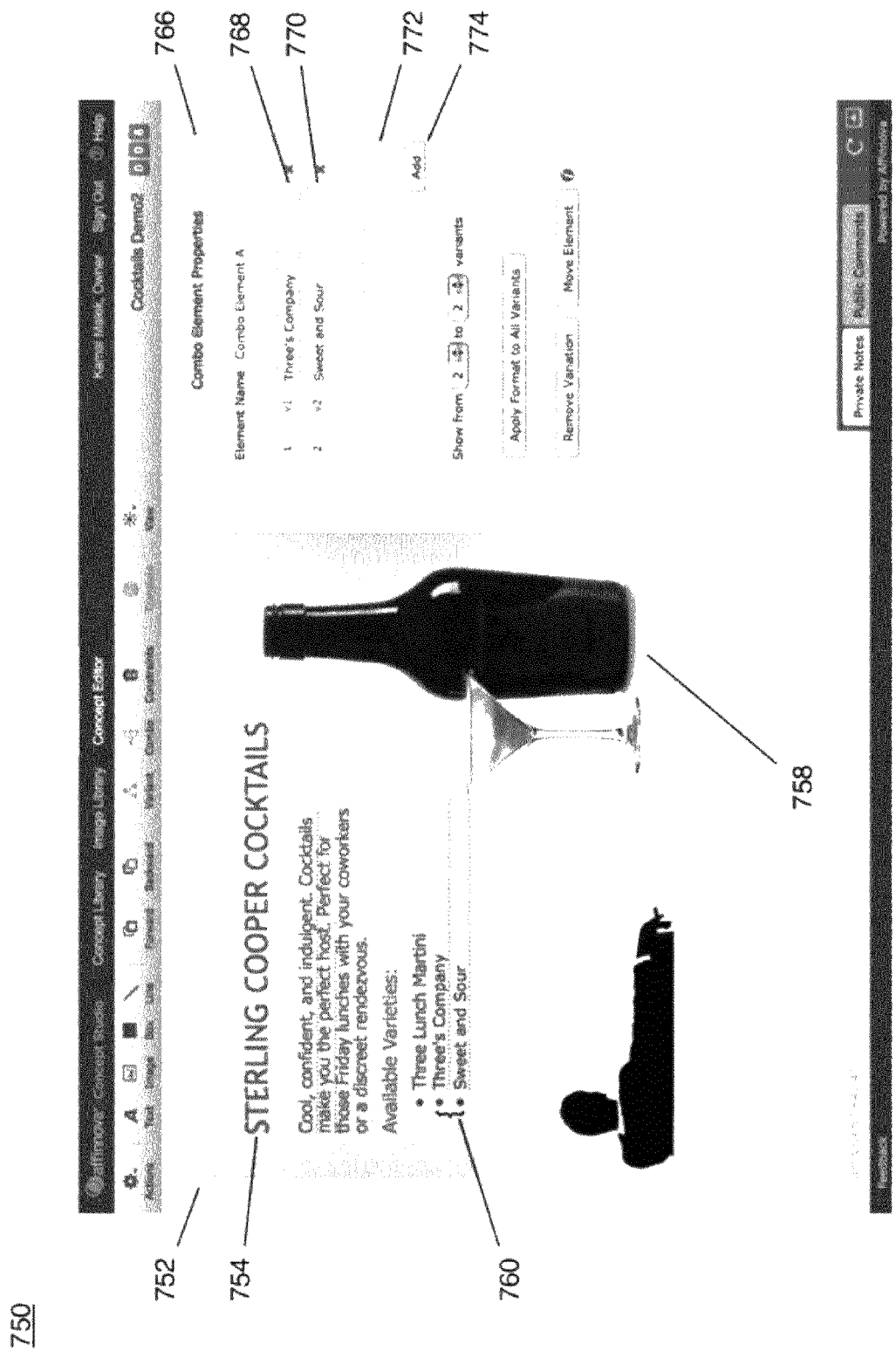
FIG. 13 graphically depicts a user interface that may be generated, at least in part, by the concept development process of FIG. 1.

Concept development process 10 may associate 704 the dynamic element with a variant list including a plurality of element variants. With reference also to FIG. 13, an in a manner similar to that described above, in response to receiving 702 the designation of the textual element as a dynamic element (e.g., upon user 46 selecting "combo" button 764 indicating a combination dynamic element), concept development process 10 may provide properties panel 766. A variant list, including one or more element variants (e.g., element variants 768, 770, which may include the bulleted items included within the dynamic element), associated with the dynamic element may be included within properties panel 766. In addition to including element variants 768, 770 included within the variant list associated with the dynamic element, properties panel 766 may provide functionality for adding additional element variants to the variant list. For example, properties panel 766 may include input field 772, into which user 46 may type additional element variants. Further, user 46 may add the additional element variants to the variant list, e.g., by selecting "add" button 774.

Figure 14:
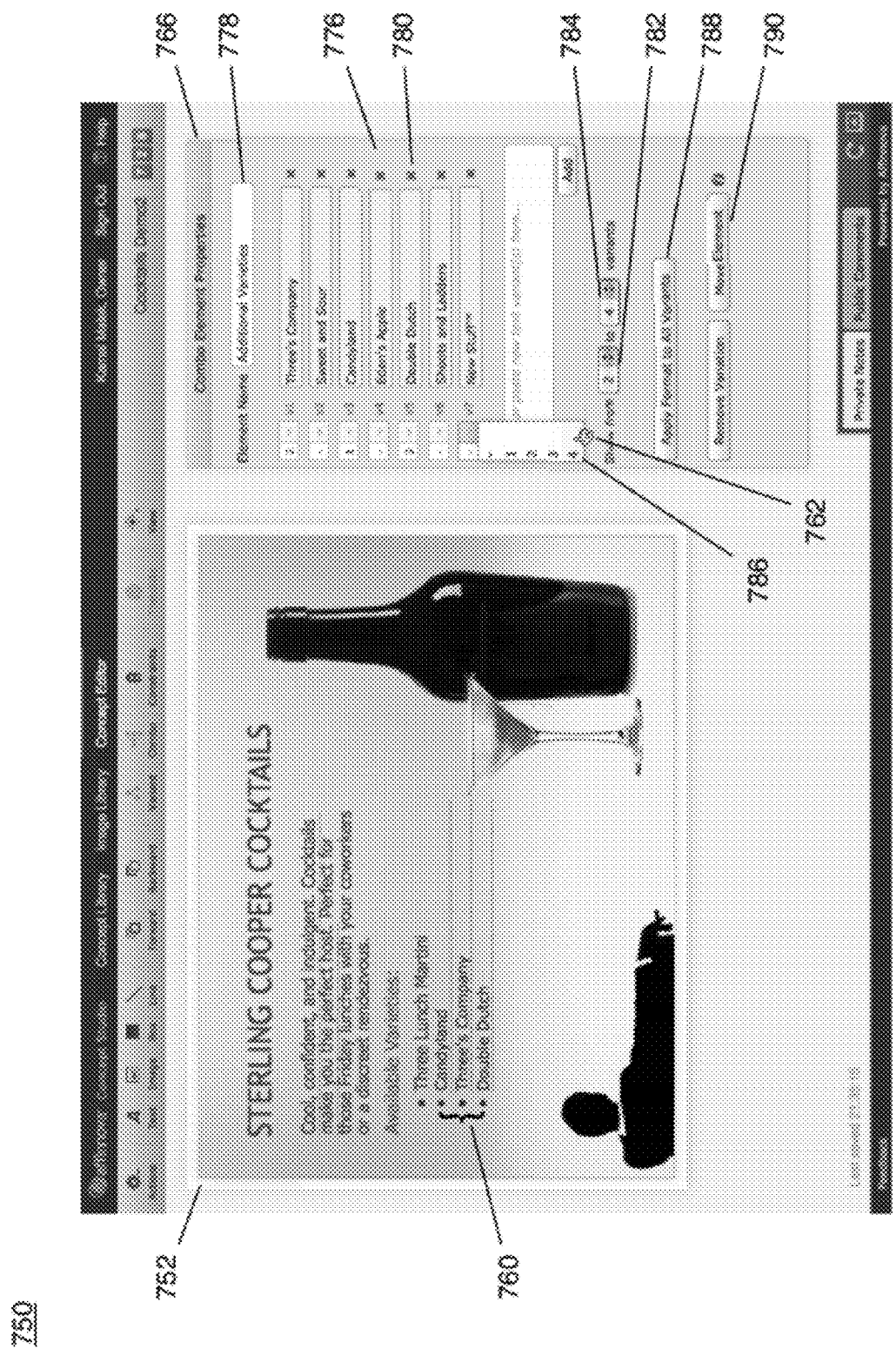
FIG. 14 graphically depicts a user interface that may be generated, at least in part, by the concept development process of FIG. 1.

Referring also to FIG. 14, upon user 46 adding additional element variants via properties panel 766, concept development process 10 may provide the variant list (e.g., variant list 776, generally) populated with the added element variants and/or the textual elements designated as the dynamic element. In an embodiment, user 46 may provide a name for the combination dynamic element, e.g., by inputting a desired name into "Element Name" filed 778. User 46 may also further edit the one or more element variants included within variant list 776, e.g., by removing one or more element variants by selecting a delete button (e.g., delete button 780) associated with each element variant.

Concept development process 10 may receive 706 a selection of a subset of the plurality of element variants from the variant list. For example, and with continued reference to FIG. 14, user 46 may select a subset of the element variants included within variant list 776 to be displayed. The subset may include one element variant included within variant list 776, all of the element variants included within variant list 776, or any portion of the element variants included within variant list 776. Additionally/alternatively, the subset may include none of the element variants included within variant list 776. In such an embodiment, the dynamic element may be an empty field (e.g., in an instantiation of the visual representation the dynamic element may not include any text or graphic). User 46 may select one or more element variants from variant list 776, e.g., by clicking on the one or more variants using onscreen pointer 762, e.g., in a similar manner as described above, and/or otherwise selecting the one or more variants. Accordingly, selection of the one or more element variants included within the subset of element variants may be based on a user selection of element variants from within the variant list 766. In response to a user selection of one or more element variants, concept development process 10 may receive 706 the selection of the subset of element variants. In addition/as an alternative to receiving 706 a selection one or more element variants in response to a user selection, concept development process 10 may receive a selection of a subset element variants based on a configuration rule, preference setting, or the like. For example, concept development process 10 may receive 706 a selection the subset of element variants based on random selection of element variants from within variant list 766, based on an element variant attribute (e.g., textually and/or graphically largest element variant; order in which the element variants were added to the variant list, etc.), and/or otherwise selected.

In an embodiment, and consistent with the foregoing description in which the element variants included within the subset may be based upon a configuration rule and/or preference (e.g., may be randomly selected from variant list 766 and/or randomly selected from a selected group of element variants), the number of element variants included within the subset may be a fixed number and/or may be a variable number (e.g., which variable number may be selected based on one or more configuration rule and/or preference, such as a preference to randomly select the number of element variants to be included in the subset). In an embodiment, concept development process may receive an indication of a minimum and/or a maximum number of element variants to include within the subset of element variants. For example, user 46 may select a minimum number of element variants to be included in the subset (e.g., by selecting a minimum number from dropdown 782), may select a maximum number of element variants to be included in the subset (e.g., by selecting a maximum number from dropdown 784), or may select both a minimum number of element variants to be included in the subset and a maximum number of variant elements to be included in the subset.

In addition to receiving 706 the selection of element variants that may be included in the subset of element variants, concept development process 10 may receive 710 layout information associated with the subset of element variants. For example, as shown in FIG. 14, user 46 may define a relative order associated with each of the element variants included within the subset of element variants. For example, user 46 may select a relative order for each of the element variants included within the subset of element variants, e.g., by selecting an order position from a dropdown menu associated with each selected element variant (e.g., dropdown menu 786 associated with the element variant "New Stuff™"). Concept development process 10 may receive the selection of the relative order associated with one or more of the element variants to be included within the subset of element variants. In an embodiment, selection of a relative order associated with one or more of the elements included within the subset of element variants may also select the element variant for inclusion within the subset of element variants. In some embodiments, e.g., in which a random number of element variants between a minimum and a maximum number may be included within the subset of element variants, the order of the element variants within the subset may be based upon the relative order associated with each of the random element variants. In an embodiment in which one or more of the element variants may not include an associated order, such element variants may be ordered according to a configuration rule or preference (e.g., may be placed in any order, may be placed first, and/or may be placed last in the subset of element variants).

In an embodiment, the layout information may include presentation information associated with the plurality of element variants. For example, concept development process 10 may format the one or more element variants included within the subset according to a format associated with selected element 760 (e.g., a bulleted list in the illustrated example). In some embodiments, concept development process 10 may apply the format to all element variants 788 in the variant list 776. Various additional/alternative mechanisms for providing presentation information may be equally utilized.

In an embodiment, the layout information may include position information associated with the plurality of element variants. For example, the dynamic element and/or a portion of the dynamic element (e.g., one or more of the subset of element variants) may by moved to a location within visual representation 752 that may be different from the location of element 760 within visual representation 752. For example, user 46 may select "Move Element" button 790. Upon selecting "Move Element" button 790, concept development process 10 may provide an interface that may allow user 46 to designate a location within visual representation 752 for one or more element variants of the subset of element variants. Accordingly, at least a portion of the subset of element variants may occupy disparate locations within the visual representation of the product concept.

Figure 15:
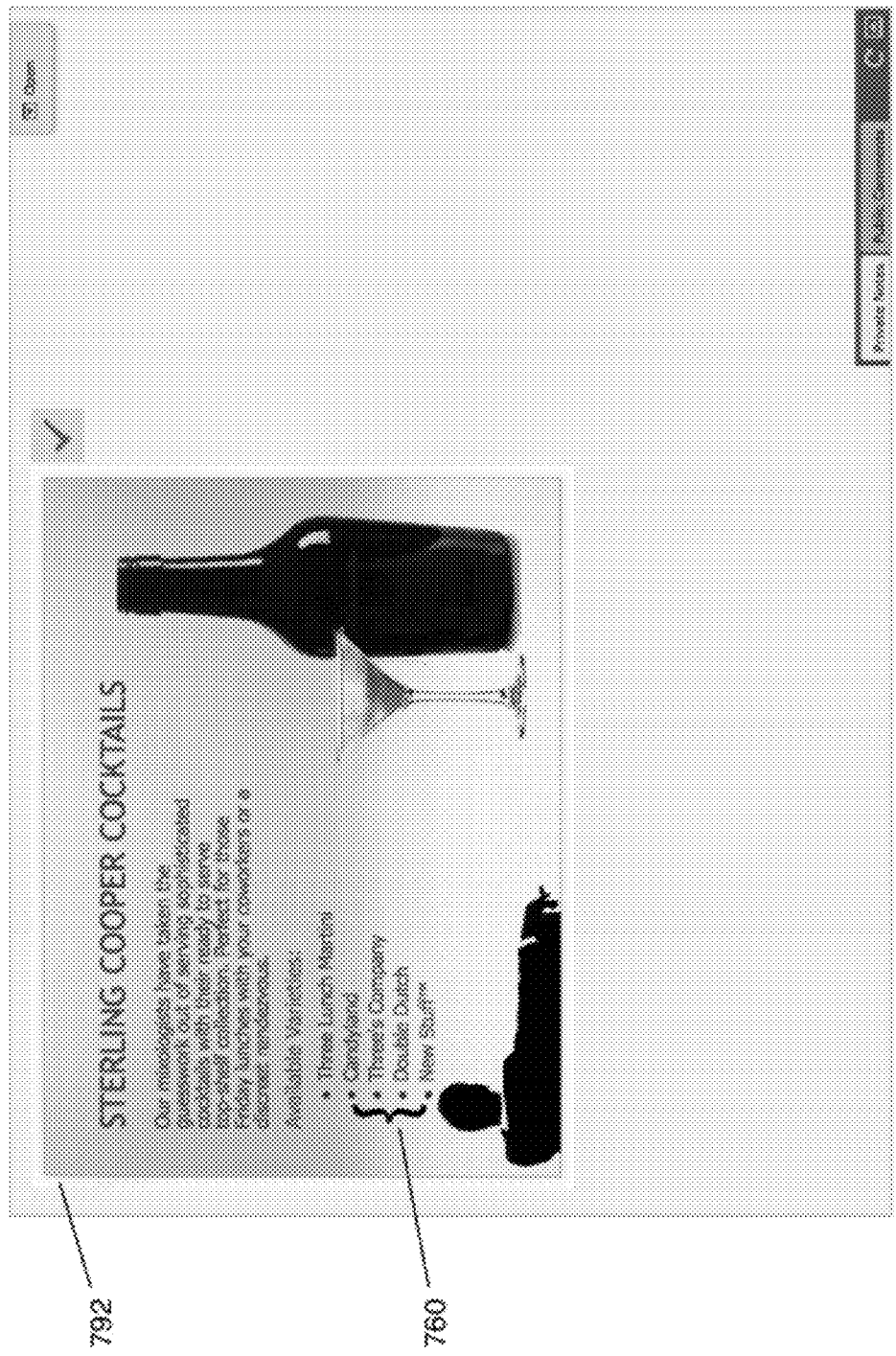
FIG. 15 graphically depicts a user interface that may be generated, at least in part, by the concept development process of FIG. 1.
Figure 16:
FIG. 16 graphically depicts a user interface that may be generated, at least in part, by the concept development process of FIG. 1.

Concept development process 10 may also generate 708 a first instantiation of the visual representation including the subset of the plurality of element variants as the dynamic element. For example, and with additional reference to FIG. 15, four element variants, namely "Three's Company," "Candyland," "Double Dutch," and "New Stuff™," may have been received 706 as element variants included within the subset of element variants. Additionally, each of the four element variants may have an associated relative order. Further, the number of element variants to be included within the subset of element variants may be between 2 and 4, e.g., based on the selection of values via dropdowns 782, 784. For example, concept development process 10 may select a random number between the specified minimum and maximum (e.g., between 2 and 4, in the foregoing example). Further, concept development process 10 may select a subset of element variants according to the selected random number. As shown in FIG. 15, concept development process 10 may generate 708 first instantiation 792 of the visual representation of the product concept including the subset of element variants "Three's Company," "Candyland," "Double Dutch," and "New Stuff™," as dynamic element 760. Additionally, the subset of element variants may be arranged according to the relative order associated with each element variant Referring also to FIG. 16, concept development process 10 may generate another instantiation 794 of the visual representation of the product concept including a different subset of element variants as dynamic element 760. As shown, the subset of element variants included as the dynamic element in instantiation 794 of the visual representation of the product concept may include less than all of the element variants selected for inclusion within the subset of element variants. In the embodiment depicted in FIG. 16, the number of element variants included within the subset of element variants may be, e.g., a random number (or other number based on one or more configuration rules, preferences, or the like) of element variant between the selected minimum and maximum number of element variants to be included in the subset of element variants.

While the foregoing aspect has been generally described in the context of a textual element, such description is intended only for the purpose of illustration and not of limitation. The features and aspects may be equally applicable to graphical elements, as when a set of flavors are represented by an array of graphical icons as opposed to, or in addition to, a textual list of flavors.

According to an embodiment, a particular element may be used in more than one place in a visual representation of a product design. For example, in the case of a product that includes an associated brand name, the brand name may be used several times throughout the descriptions of features and benefits of the product. As another example, an ingredient may be used in several places in the visual representation, such as in a list of product features and in a description of resulting benefits. According to one aspect, the concept development process may allow multiple instances of an element to be easily replaced with different variants of the element.

Figure 17:
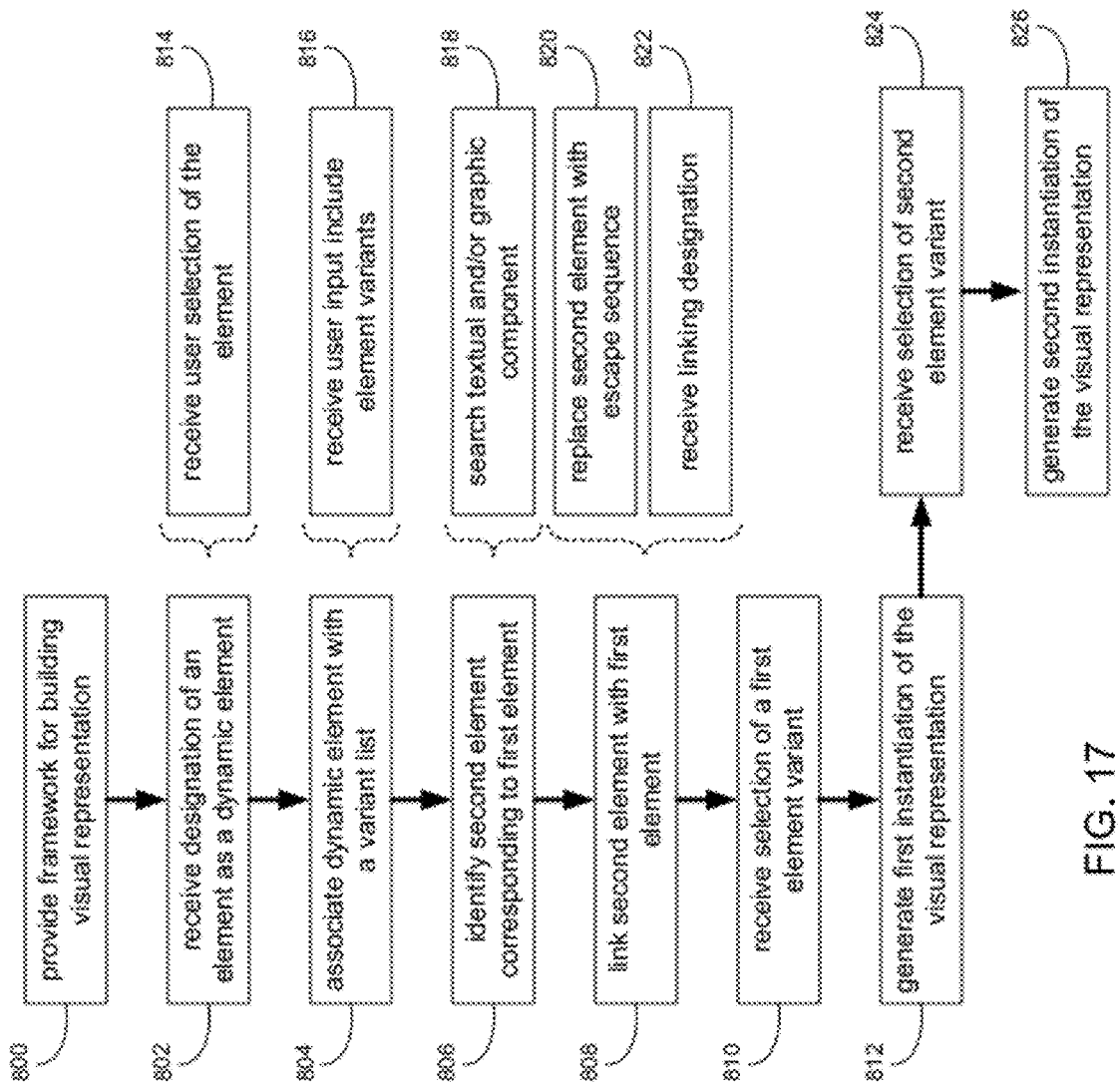
FIG. 17 is a flow chart of a process that may be executed by the concept development process of FIG. 1.

According to an example embodiment, and referring also to FIG. 17, concept development process 10 may provide 800 a framework for building a visual representation of a product concept. The visual representation may include one or more of a textual component and a graphical component. Concept development process may receive 802 a designation of a first element within at least one of the textual component and the graphical components as a dynamic element. Concept development process 10 may also associate 804 the dynamic element with a variant list including one or more element variants. A second element may be identified 806 corresponding to the first element. Concept development process 10 may link 808 the second element with the first element. A selection may be received 810 of a first element variant from the variant list. Concept development process 10 may also generate 812 a first instantiation of the visual representation including the first element variant as the dynamic element and including the first element variant as the second element.

Figure 18:
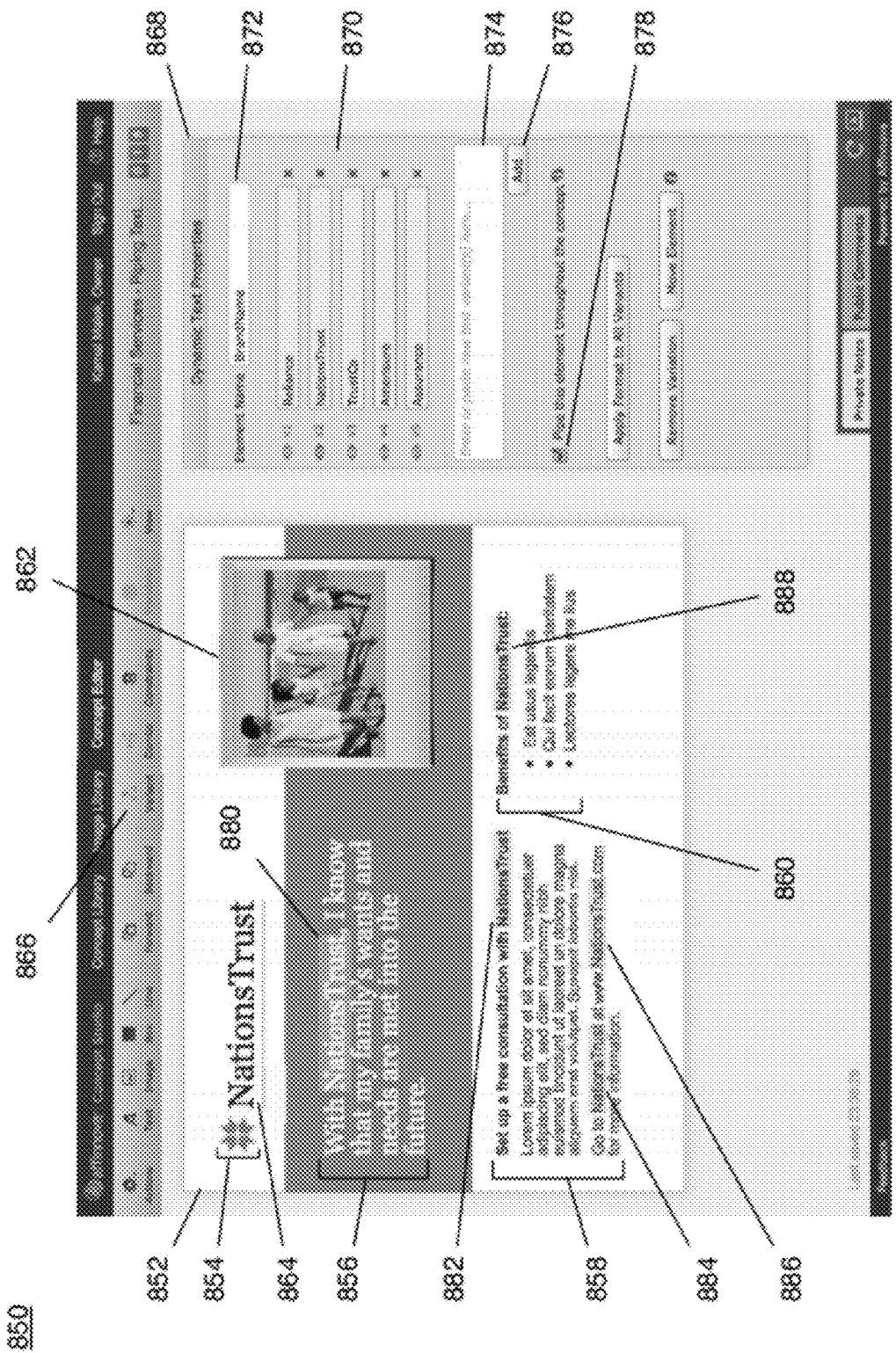
FIG. 18 graphically depicts a user interface that may be generated, at least in part, by the concept development process of FIG. 1.

For example, and referring also to FIG. 18 concept development process 10 may provide 800 a framework for building a visual representation of a product concept. The framework for building the visual representation of the product concept may include visual representation user interface 850 for developing visual representation 852 of the product concept. Visual representation 852 may include one or more of a textual component (e.g., textual components 854, 856, 858, and 860) and a graphical component (e.g., graphical component 862).

Concept development process may receive 802 a designation of a first element within at least one of the textual component and the graphical components as a dynamic element. According to one embodiment, receiving 802 the designation of the first element as a dynamic element may include receiving 814 a user selection of the first element. For example, and in a manner similar to that described above, a user (e.g., user 46) may select a first element (e.g., textual element 864) from within textual component 854, e.g., by highlighting element 864 using an onscreen pointer (not shown) controlled by a pointing device, such as a mouse (not shown). User may further select (e.g., via the onscreen pointer) "variant" button 866 from within a toolbar associated with visual representation user interface 850. In response to user 46 selecting element 864 and selecting "variant" button 866, concept development process 10 may receive 802 a designation of element 864 (i.e., "NationsTrust") within textual component 854 as being a dynamic element. In various additional/alternative embodiments, the concept development process may receive the designation of the textual element as a dynamic element in response to, e.g., a pop-up interface, or other suitable interface. Further, in some embodiments, the concept development process may receive the designation of the textual element as a dynamic element in response to identifying an escape sequence. For example, and in a similar manner as discussed above, user 46 may replace element 864 with an escape sequence identifying element 864 as a dynamic element. Further, rather than replacing element 864 with an escape sequence (e.g., after previously creating the text "NationsTrust") user 46 may provide the escape sequence during initial creation of textual component 854.

Concept development process 10 may also associate 804 the dynamic element with a variant list including one or more element variants. For example, and in a similar manner as previously described, in response to receiving 802 the designation of element 864 as a dynamic element (e.g., in response to user 46 selecting element 864 and selecting "variant" button 866), concept development process may provide properties panel 868. Properties panel 868 may include a variant list (e.g., variant list 870, generally) associated with the dynamic element. Variant list 870 may include at least first element 864 as an element variant. Additionally, properties panel 868 may include identifier 872 associated with the dynamic element.

Associating 804 the dynamic element with variant list 870 may include receiving 816 a user input including the one or more element variants. For example, in addition to including element 864, user 46 may add additional element variants to variant list 870. For example, properties panel 868 may include variant input field 874, via which user 46 may input (e.g., as through typing, copy and paste functionality, or the like) one or more additional element variants. Upon entering an element variant into variant input field 874, user 46 may select "add" button 876. In response to user 46 inputting an element variant into input field 874 and selecting "add" button 876, concept development process 10 may add the input variant to variant list 870. In addition/as an alternative to inputting individual element variants, in some embodiments, a link to a spreadsheet (which may include textual component, links to graphical components, or the like), CSV file (which may include textual component, links to graphical components, or the like), image url's, etc. may be provided (e.g., input into input field 874). In response to inputting a link or other reference, concept development process may import element variants associated with a link or referenced file, and may add such element variants to the variant list.

A second element may be identified 806 corresponding to the first element. In an example embodiment, identifying 806 the second element corresponding to the first element may include searching 818 at least one of the textual component and the graphical component based on the first element. For example, user 46 select (e.g., using the onscreen pointer) option 878 (i.e., "Pipe this element throughout the concept") from within properties panel 868. In response to selecting option 878, concept development process 10 may search 818 one or more textual components (e.g., textual components 854, 856, 858, 860) and/or one or more graphical components (e.g., graphical component 862 and/or a textual element, such as a label, associated with the graphical component) for additional elements corresponding to first element 864. Additionally elements corresponding to first element 864 may include, for example, textual element including the same character sequence as first element 864. For example, based on searching 818 at least one of the textual component and the graphical component based on first element 854, concept development process 10 may identify 806 a second element (e.g., one or more of elements 880, 882, 884, 886, 888) within textual components 856, 858, 860. In additional/alternative embodiments, elements corresponding to the first element may include one or more corresponding attributes, such as corresponding character sequence, corresponding formatting attributes, corresponding element type, etc. Elements corresponding to the first element may be determined based on one or more configuration rules and/or preferences.

Figure 19:
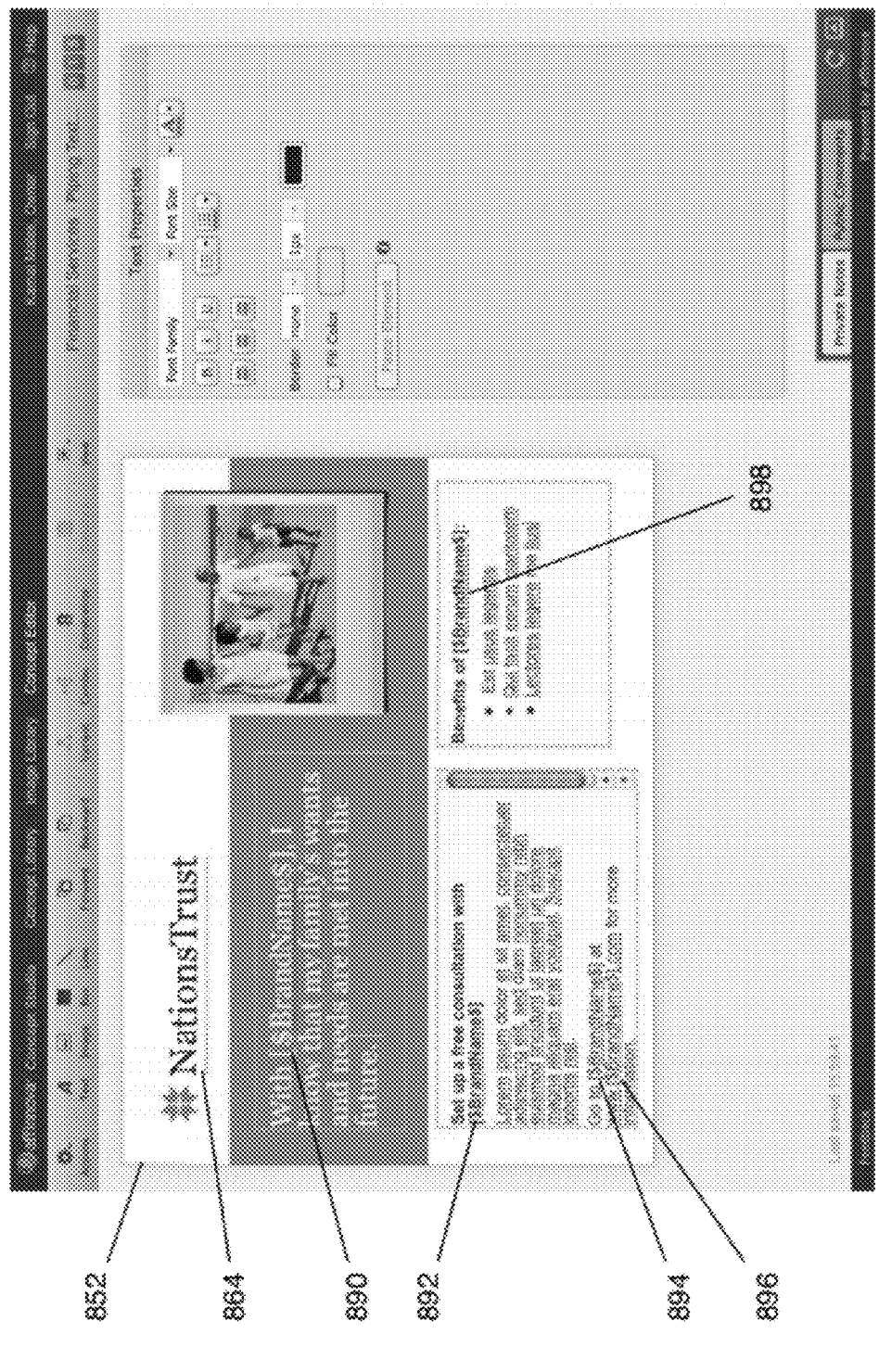
FIG. 19 graphically depicts a user interface that may be generated, at least in part, by the concept development process of FIG. 1.

Concept development process 10 may link 808 the second element with the first element. In an example embodiment, linking 808 the second element with the first element may include replacing 820 the second element with an escape sequence associated with the dynamic element. For example, and referring also to FIG. 19, concept development process 10 may replace at least a portion of the corresponding second elements (e.g., elements 880, 882, 884, 886, 888) with an escape sequence (e.g., escape sequence $BrandName$ 890, 892, 894, 896, 898). While the escape sequence $BrandName$ has been shown in the illustrated embodiment, such illustration and description is intended only for the purpose of illustration and not of limitation, as various additional/alternative escape sequences may be used to link the second element with the first element.

In an additional/alternative embodiment, linking 808 the second element with the first element may include receiving 822 a linking designation. For example, while not shown, user 46 may manually select one or more second elements and may provide a designation linking the one or more second elements with the first element. Providing a designation linking the one or more second elements with the first element may include, for example, highlighting and right-clicking (e.g., via an onscreen pointer controlled by a pointing device) on each of the second elements. Right-clicking on a selected second element may result in the concept development process rendering a pop-up window or dialog box. The pop-up window or dialog box may include an option to link the selected element with a dynamic element (i.e., the first element that has been designated a dynamic element). In some such embodiments, the concept development process may search the visual representation for second elements corresponding to the first element, and may allow a user to manually (e.g., via right-clicking as discussed above) provide a linking designation. The concept development process may receive the linking designation manually provided by the user. Various additional/alternative implementations may be equally utilized.

Figure 20:
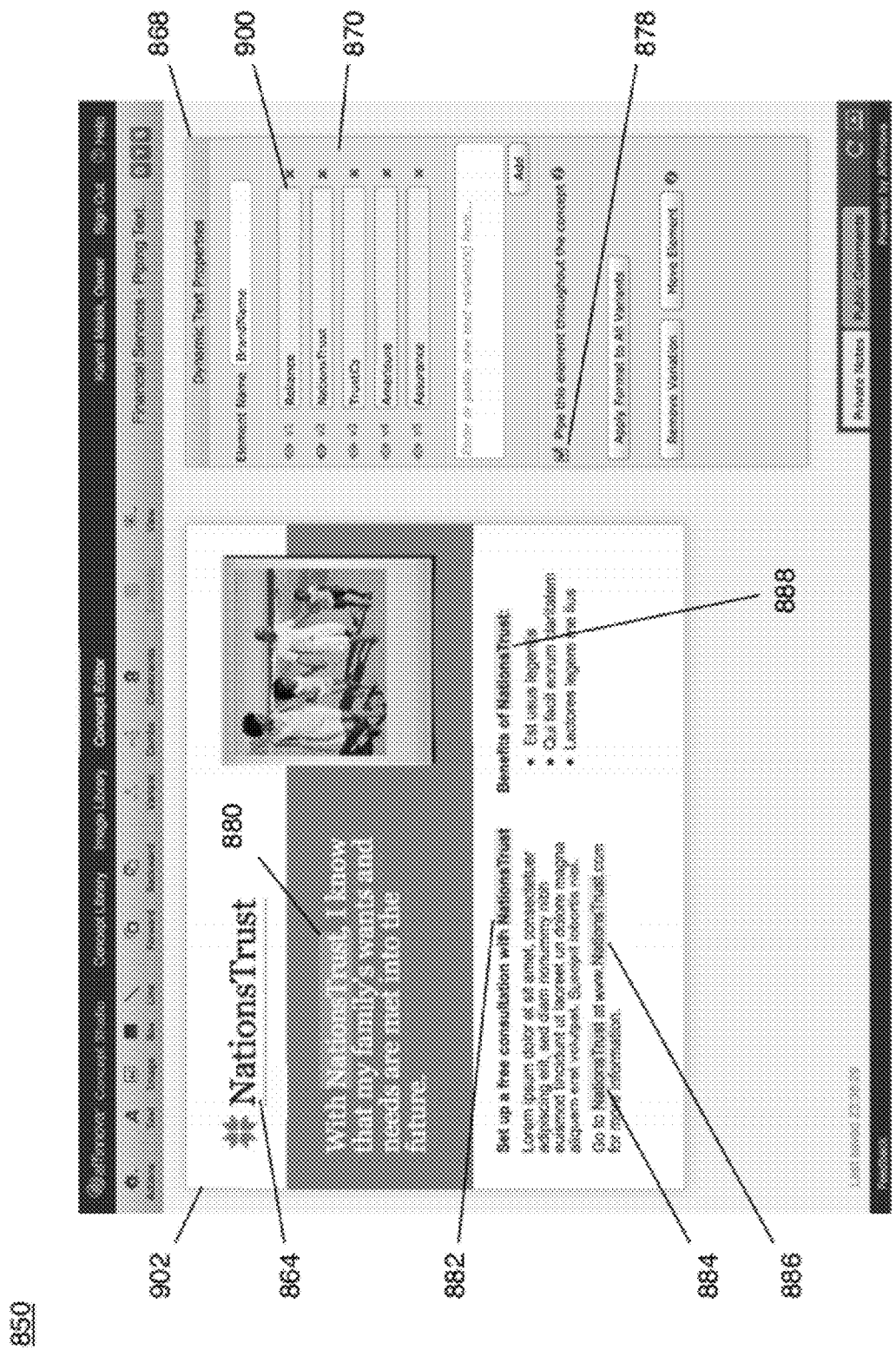
FIG. 20 graphically depicts a user interface that may be generated, at least in part, by the concept development process of FIG. 1.

A selection may be received 810 of a first element variant from the variant list. For example, and with reference also to FIG. 20, user 46 may select (e.g., using the onscreen pointer) an element variant (e.g., element variant 900 "Reliance") from variant list 870 within properties panel 868. In response to user 46 selecting element variant 900 and option 878 (i.e., "Pipe this element throughout the concept"), concept development process 10 may generate 812 a first instantiation (i.e., first instantiation 902) of the visual representation of the product concept including the first element variant as the dynamic element and including the first element variant as the second element. For example, as shown, concept development process 10 may replace the first element (i.e., the dynamic element 864) and each of the linked second elements (i.e., second elements 880, 882, 884, 886, 888) with the selected element variant 900 (i.e., "Reliance").

Additionally, in some embodiments, concept variant may receive 824 a selection of a second element variant from the variant list. For example, user 46 may select a different element variant from within variant list 870 (e.g., the variant "TrustCo"). As described above, in response to user 46 selecting the second element variant "TrustCo" and the option 878 "Pipe this element throughout the concept," concept development process 10 may generate 826 a second instantiation (not shown) of the visual representation of the product concept. The second instantiation of the visual representation of the product concept may be generally analogous to the first instantiation, but with the dynamic element and the one or more second elements replaced with the selected second element variant "TrustCo."

In some embodiments, the concept development process may enable outlying combinations of element variants, in particular, the longest combination of variants, to be verified. For example, the concept development process may enable verification that, even when the densest element variants are combined, the visual representation of the product concept may remain acceptable, for example, in terms of layout (e.g., making sure that different textual elements do not interfere with one another), aesthetics (e.g., avoiding an overwhelming amount of text with too little white space), and legibility and comprehension given the intended audience. Accordingly, in an embodiment the concept development process may partially and/or fully automate searching through the different element variants (e.g., which may be associated with one or more dynamic elements) to identify the longer ones, searching through one or more sets of constraints to identify the legal combinations, and generating instantiations of the visual representation of the product concept including such longest (and/or shortest) permissible (e.g., based on any constraints associated with the element variants) combinations of element variants. In some embodiments, the concept development process may also enable partially and/or fully automated adjustments of the layout of the visual representation to allow such combinations to fit within the visual representation in an acceptable manner, and/or edit one or more textual elements to shorten the combination of element variants.

According to such an embodiment, the concept development process may enable the user to design a visual representation of a product concept in order to, for example, avoid the content of one element interfering with the content of another; to maintain the legibility of the various elements, in particular the textual ones; maintaining a certain balance between the various elements so as to avoid biasing decision-making; and/or to achieve a desired aesthetic effect, etc. Such functionality of the concept development process may take into account variable combination elements and/or any constraints or rules associated between two or more element variants. The concept development process may, therefore, save the user the wasted effort of optimizing the layout and presentation for a combination of element variants that would never be instantiated (e.g., for aesthetic reasons, legibility reasons, and/or reasons based on constraints associated between element variants).

In some embodiments, the concept development process may at least partially and/or fully automatically perform at least some of the layout and formatting optimizations discussed above, for example, taking into account one or more predefined rules and/or constraints. Examples of rules that may be taken into account by the concept development process may include: maintaining a minimum font size for legibility of textual elements; not exceeding a certain difference in font size between textual elements, (e.g., to thereby minimize biasing effects in decision-making or consumer preference measurement); maintaining the aspect ratio of graphical elements; limiting magnification of graphical elements to avoid pixilation; maintaining a minimum separation (or "white space") between elements, etc.

In an embodiment, the concept development process may facilitate tracking the number of concept alternatives enabled by various element variants, for example, as element variants are added or removed, and/or as constraints or other parameters are added, removed, or edited. For example the concept development process 10 may track (e.g., monitor, log, and/or provide an indication of) one or more of the following measures: the raw space size (e.g., the total size of the space of possible concept alternatives not taking into accounts any constraints or rules); the exact constrained space size; an approximation to the constrained space size (e.g., which may be a desirable measure, e.g., in an embodiment in which computing the exact constrained space size may be undesirably time consuming to provide a timely answer to the user).

Figure 21:
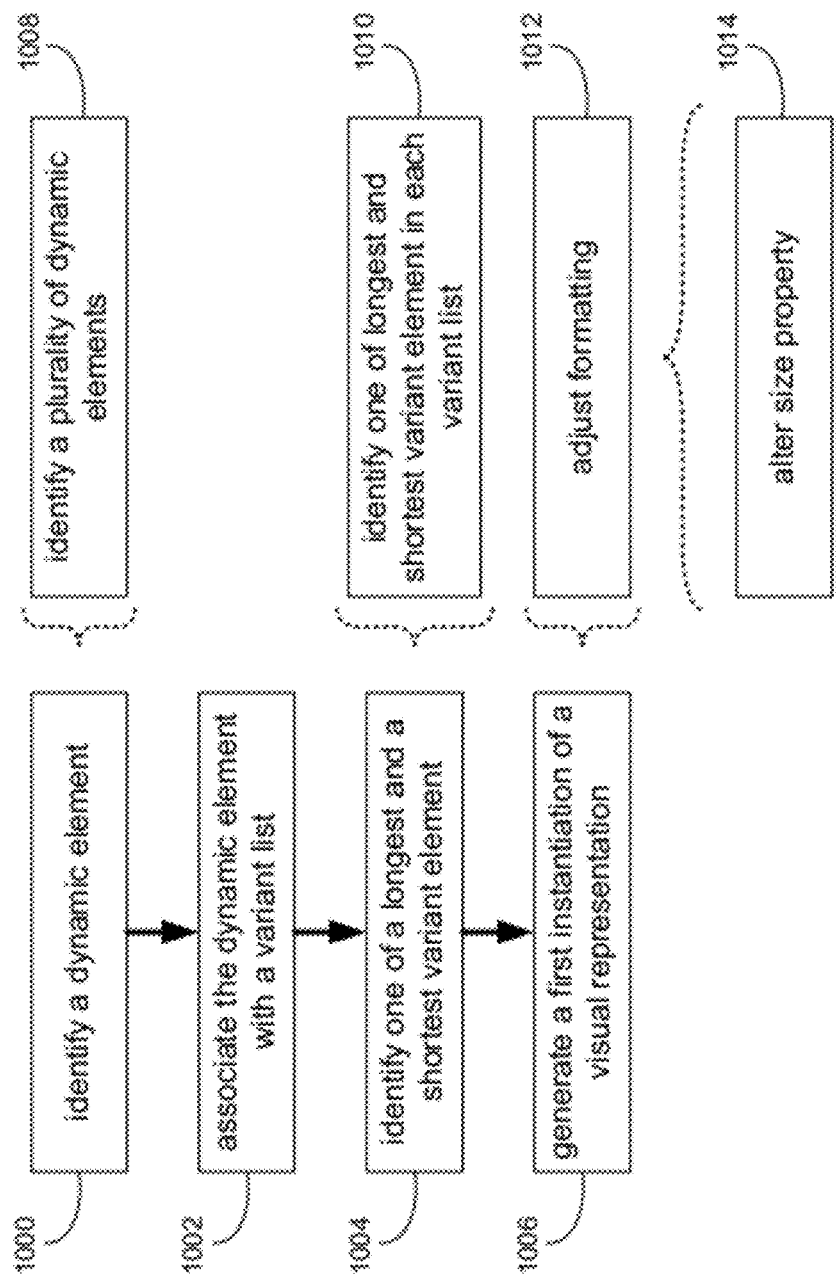
FIG. 21 is a flow chart of a process that may be executed by the concept development process of FIG. 1.

Consistent with the foregoing, and referring also to FIG. 21, according to an example embodiment, concept development process 10 may identify 1000 a dynamic element within framework for building a visual representation of a product concept. The visual representation may include one or more of a textual component and a graphical component. Concept development process 10 may also associate 1002 the dynamic element with a variant list including one or more variant elements. Concept development process 10 may identify 1004 one of a longest variant element and a shortest variant element from within the variant list. Concept development process may also generate 1006 a first instantiation of a visual representation of a product concept including the one of the longest variant element and the shortest variant element as the dynamic element.

Figure 22:
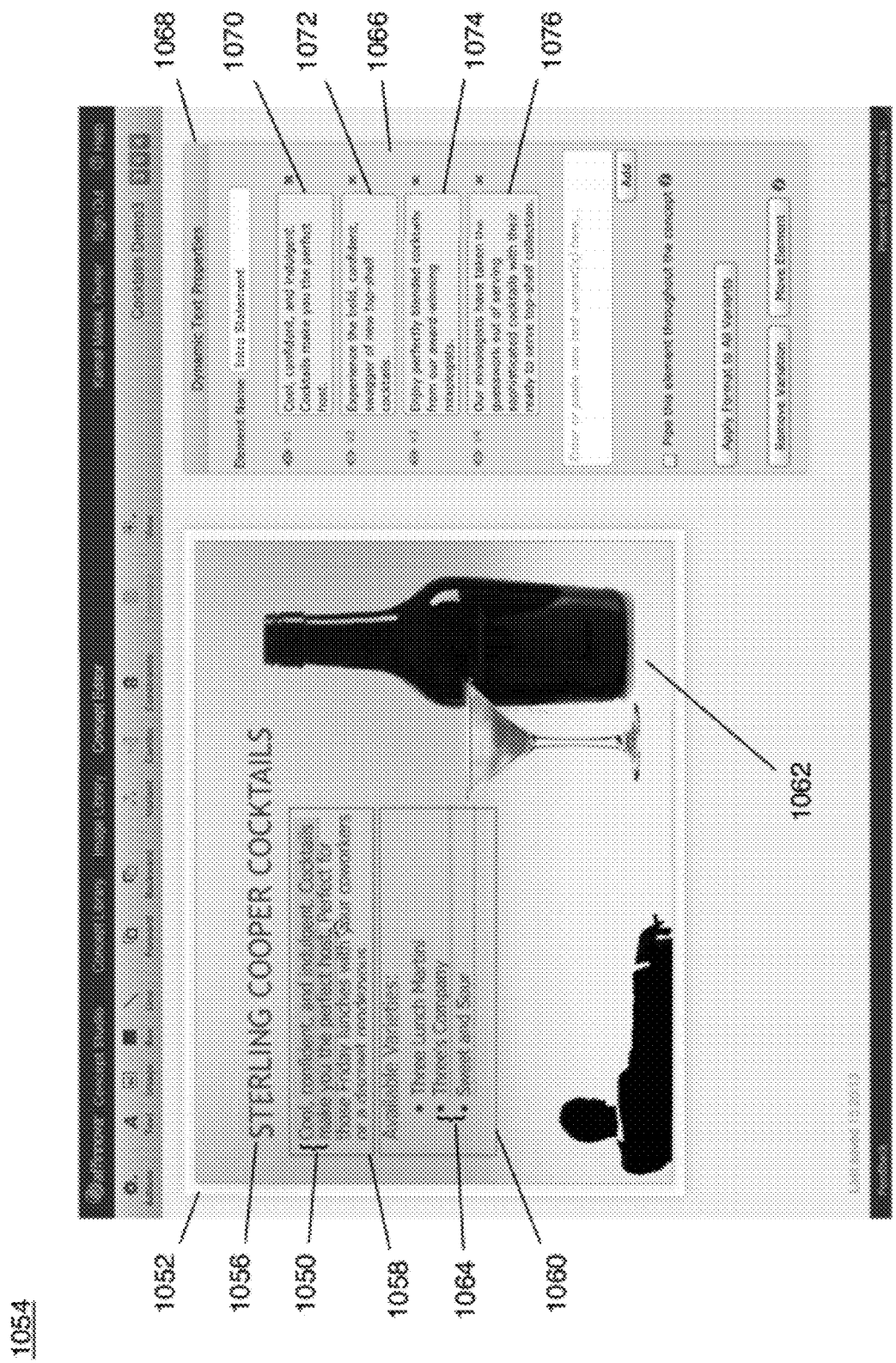
FIG. 22 graphically depicts a user interface that may be generated, at least in part, by the concept development process of FIG. 1.

For example, and referring also to FIG. 22, concept development process 10 may identify 1000 a dynamic element (e.g., first dynamic element 1050 "Cool, confident, and indulgent. Cocktails make you the perfect host") within framework for building a visual representation of a product concept (e.g., visual representation 1052 provided within visual representation user interface 1054). Visual representation 1052 may include one or more of a textual component (e.g., textual components 1056, 1058, 1060) and a graphical component (e.g., graphical component 1062). In some embodiments, identifying 100 the dynamic element may include identifying 1008 a plurality of dynamic elements (e.g., first dynamic element 1050 and second dynamic element 1064). The one or more dynamic elements (e.g., first dynamic element 1050, and second dynamic element 1064) may have been defined in a similar manner as discussed in one or more previous examples above.

Concept development process 10 may associate 1002 the dynamic element with a variant list including one or more variant elements. For example, concept development process 10 may associate 1002 first dynamic element 1050 with first variant list 1066, generally, shown within properties panel 1068. First variant list 1066 may include one or more element variants (e.g., element variants 1070, 1072, 1074, 1076) associated with first dynamic element 1050. In an embodiment in which visual representation 1052 may include a plurality of dynamic elements, concept development process 10 may associate each of the plurality of dynamic elements with a respective variant list. For example, and with further reference to FIG. 23, second dynamic element 1064 may be associated with second variant list 1078, generally, shown in properties panel 1080. Second variant list 1078 may include one or more element variants (e.g., element variants 1082, 1084, 1086, 1088, 1090, 1092, 1094) associated with second element variant 1064. First and second dynamic elements 1050, 1064 may be created, and may be associated with respective first and second variant lists 1066, 1078 in a similar manner as described above. Further, as also generally described above, element variants may be added and/or removed from respective first and second variant lists 1066, 1078, and/or may be edited. Further, first and second dynamic elements 1050, 1064 may have been previously associated with respective first and second variant lists 1066, 1078.

Concept development process 10 may identify 1004 one of a longest variant element and a shortest variant element from within the variant list. In an embodiment including a plurality of dynamic elements (e.g., first dynamic element 1050 and second dynamic element 1064) identifying 1004 one of the longest variant element and the shortest variant element may include identifying 1010 one of the longest variant element associated with each of the plurality of dynamic elements and the shortest variant element included within a respective variant list associated with each of the plurality of dynamic elements. For example, first variant list 1066 may include a plurality of textual element variants (e.g., element variants 1070, 1072, 1074, 1076) having different length of text. For example, as shown in FIG. 22, of the element variants included within first variant list 1066, element variant 1072 may have the shortest text length, and element variant 1076 may have the longest text length. Accordingly, concept development process 10 may identify 1010 element variant 1076 as the longest element variant associated with first dynamic element 1050, and/or may identify 1010 element variant 1072 as the shortest element variant associated with first dynamic element 1052.

Figure 23:
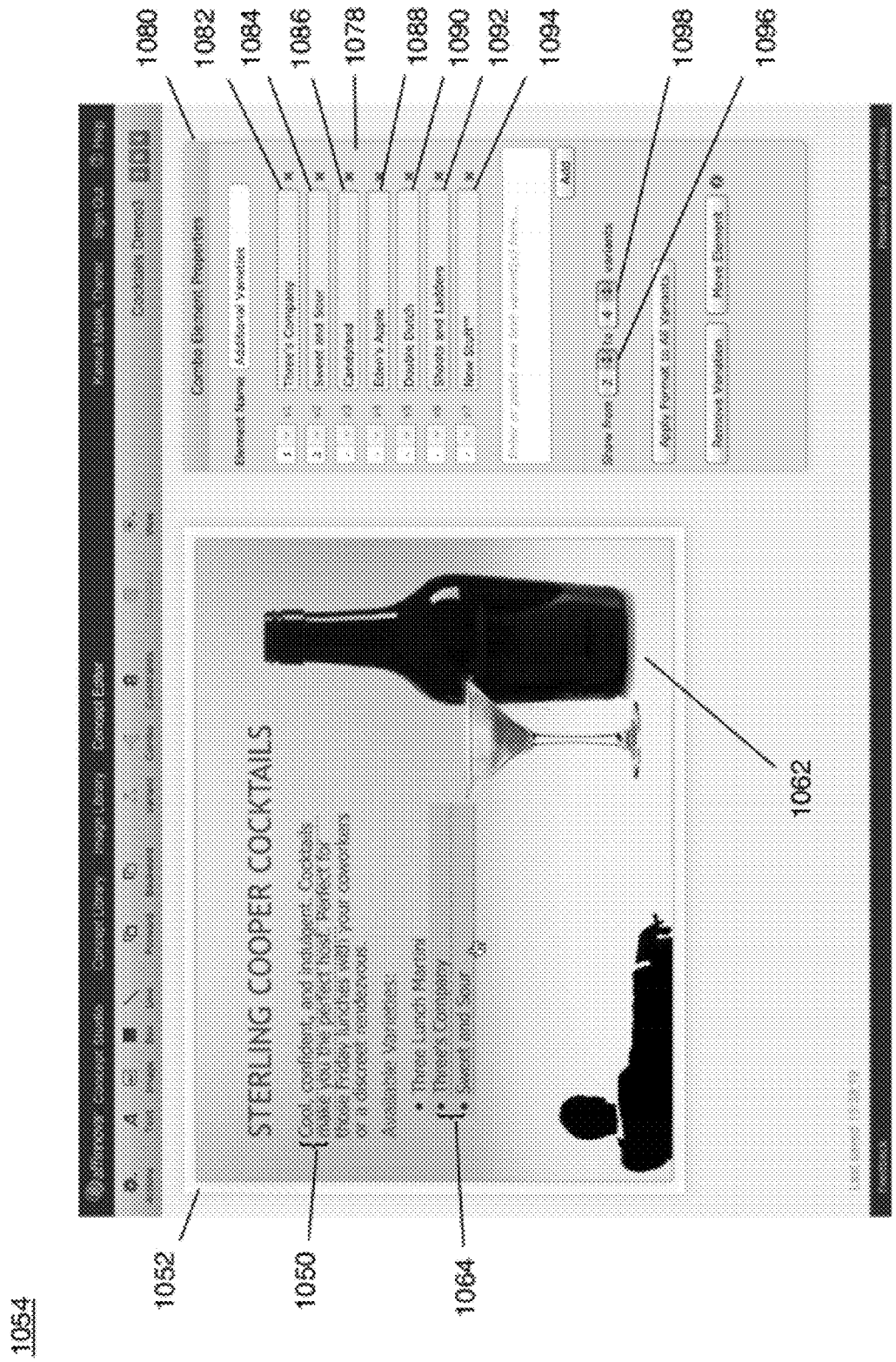
FIG. 23 graphically depicts a user interface that may be generated, at least in part, by the concept development process of FIG. 1.

Further, as shown in FIG. 23, the various element variants included within second variant list 1078 may each have a generally comparable text length (e.g., with element variant 1086 having a marginally shortest text length and element variant 1092 having a marginally longest text length). However, in the illustrated embodiment, second dynamic element 1064 may be associated with a combination element (e.g., as indicated in the header of properties panel 1080). As such, in some embodiments, more than one element variant may replace second dynamic element 1064 in a given instantiation of a visual representation of a product concept. For example, based on dropdowns 1096, 1098, second dynamic element 1064 may be replaced by a combination of between two and four element variants from within second variant list 1078 in a given instantiation of a visual representation of a product concept. Accordingly, concept development process 10 may identify 1010 a combination of two element variants (e.g., having a nominally similar length) from second variant list 1078 as being the shortest combination associated with second dynamic element 1064, and/or may identify 1010 a combination of four element variants (e.g., having a nominally similar length) from second variant list 1078 as being the longest combination associated with second dynamic element 1064. In some embodiments, in addition to identifying the longest and/or shortest combination based on the number of element variants included within the combination, the concept development process may also identify which combination of specific element variants may provide the longest and/or shortest (e.g., in terms of absolute textual length) combination associated with a dynamic combination variable.

In an embodiment, identifying 1010 one of the longest element variant and the shortest element variant included within a respective variant list associated with each of plurality of dynamic elements may be based on a constraint associated between two or more dynamic elements. For example, as discussed above, in some embodiments one or more constraints may be associated between two or more dynamic elements and/or two or more element variants. Concept development process 10 may identify 1010 the longest and/or shortest element variant associated with each respective variant list based on any such constraints. For example, if, based on a constraint associated between two element variants, the two element variants are prohibited from being included in the same instantiation of a visual representation of a product concept, concept development process 10 may not identify a longest and/or shortest element variant associated with each respective variant list if the longest and/or shortest element variant associated with each list may not be included in the same instantiation of a visual representation of a product concept based on a constraint associated between the element variants. Rather, in an embodiment, concept development process 10 may only identify 1010 a longest and/or shortest element variant associated with each respective variant list that may permissibly be included within the same instantiation of a visual representation of a product concept.

Concept development process 10 may generate 1006 a first instantiation of a visual representation of a product concept including the one of the longest variant element and the shortest variant element as the dynamic element. For example, and referring also to FIG. 24, concept development process 10 may generate 1006 a first instantiation 1100 of a visual representation of a product concept including the longest element variant associated with first dynamic element 1050 (i.e., longest element variant 1076 from first variant list 1066) and the longest element variant associated with second dynamic element 1064 (i.e., a combination of four element variants from second variant list 1078). While FIG. 24 depicts a first instantiation of a visual representation of a product concept including the longest element variants, the concept development process may additionally/alternatively generate a first instantiation of a visual representation of a product concept including the shortest element variants in a generally related manner.

In an embodiment, generating 1006 the first instantiation of the visual representation may include adjusting 1012 a formatting of the visual representation based on the one of the longest element variant and the shortest element variant. For example, and referring also to FIG. 25, concept development process 10 may generation an instantiation 1102 of a visual representation of the product concept including adjusting 1012 the formatting of instantiation 1102 of the visual representation, e.g., by providing second dynamic element 1064 in two columns, e.g., to thereby provide greater separation between textual component 1060 (e.g., which may include second dynamic element 1064) and graphical component 1104. According to various additional and/or alternative embodiments, adjusting 1012 the formatting of the visual representation may include altering 1014 a size property associated with one or more components of the visual representation. A size property associated with one or more components of the visual representation may include, for example, a size of an image, a size of a text block (e.g., a textual component), a font size associated with one or more textual components, or the like. In various embodiments, altering 1014 a size property associated with one or more components of the visual representation may include altering the size property based on one or more formatting rules. For example, one or more configuration rules and/or preferences may specify a minimum and/or a maximum font size that may be utilized in connection with one or more textual components, a maximum difference in font size between two or more different textual components, a maximum enlargement of a graphical element (e.g., relative to a native resolution of the graphical element, which may thereby prevent and/or reduce an undesired degree of pixilation of the graphical element), a maximum change in white space (e.g., separation between components of the visual representation), or the like.

According to another aspect, the present disclosure may provide systems and methods for scoring a visual representation of a product concept based on a number of dimensions, and assessing its appropriateness for use in a market research study or other measurement or decision-making activity, for example, based on an intended audience, locale, and available computer hardware and software. Examples of the dimensions may include, but are not limited to, one or more of the following measures, and combinations thereof. One dimension may include reading level, which may be measured, for example, using the average word length of the textual elements, or using the Flesch-Kincaid metric that may take into account the average count of syllables per word and words per sentence. Another metric that may be utilized is the SMOG (Simple Measure of Gobbledygook) metric, which may generally count polysyllables and number of sentences. Other readability metrics are also contemplated by the present disclosure, including metrics that may be specific to certain languages and/or dialects. Another dimension that may be utilized is legibility of the textual elements, which may be measured, for example, using metrics that may include one or more of font style and font size, font color, background color, and/or the contrast between font color and background color, e.g., also taking into account the viewing conditions (e.g., indoors or outdoors). Another dimension that may be utilized may include the overall cognitive load involved in reading, comprehending, and retaining the information communicated by a visual representation of a product concept, which may be required to answer questions about that concept in a survey or concept test, for example. Another metric may relate to the cognitive load involved in comparing two or more variants of a concept, e.g., as may be required from respondents participating in a choice-based market research study, such as a concept optimization study or a conjoint measurement study. The objective in such an embodiment may be to avoid overtaxing the respondents participating in such studies, e.g., in order to keep response error rates and cheating rates to a minimum. The metrics used to assess cognitive load may include the total number of elements in the visual representation, and/or the type and layout of the elements within the visual representation. For textual elements, the metrics may include an average amount of text (word count), the readability and legibility levels as described above, among others. For graphical elements, the metrics may account for the type of graphical involved (mood photography, simple line art, complex line art, photorealistic representations of product labels, including detailed product information such as nutrition information panels in food products). The metrics may also include a measure of the difference between element variants and the salience of these differences. A respondent in a choice exercise involving different versions of the concept may incur a greater cognitive load identifying differences between highly similar elements first, and formulating a preference between them secondly.

According to another aspect, the present disclosure may provide systems and methods that may include generating and providing a user (user 46, for example) with metrics and diagnostic information that may relate to the impact of constraints and rules on the space of possible concept alternatives within a visual representation of a product concept. Such an assessment may be utilized, for example, in cases where the visual representation of the concept and/or variants of the visual representation may be used in an optimization and/or conjoint measurement study. An example of a concept optimization process may include interactive search and optimization technology developed by Affinnova, Inc., of Waltham, Mass. (Afeyan et al. (2006) and Malek et al. (2007)). According to such a process, various aspects of the constraints network (number of constraints, type of constraints, their interconnectedness) may impact the ease of transitioning from one legal concept alternative to another one, and therefore may impact the efficiency of the search and optimization process. In a case of a designed experiment, such as a conjoint measurement study, the constraints may impact the quality of the Design of Experiments used during data collection.

In an embodiment, assessing and scoring the impact of constraints on the space of possible concept variations may rely on various computational means, which may include graph theoretical computation methods and Monte Carlo simulation based techniques. In the former, graphs may be generated to represent the constraints relationships between the various concept elements and/or their variants. The graphs may be weighted to reflect different types of constraints rules. Properties of the graphs may then be used as measures of the potential impact of the constraints structure, including the degree or valency of the vertices (elements or variants) and/or different properties of the adjacency and/or distance matrices relating the different elements. In the case of Monte Carlo based techniques, random variations of the concept may be generated using randomly selected element variants, and may then tested for any constraints violations. Different metrics derived from this process may be used as measures of the density and complexity of the constraints structure, which may include the proportion of failures or illegal concept instantiations created to total concept instantiations created. Additionally/alternatively, a set number of concept alternatives may be generated in a quasi-random fashion, e.g., with element variants being selected following one or more random or deterministic sequences. As a variant is selected for each element, the constraint rules may be tested. If a violation exists, a different variant may be selected for the element in question, e.g., with backtracking up the element sequence. According to such an embodiment, various metrics may be available for use as a measure of constraints complexity, e.g., including the number of failures, the number of backtracking events, the computational time needed to generate the desired number of legal alternatives, etc.

According to an embodiment, verification may be provided that one or more of the results of the various assessment and scoring procedures outlined above, e.g., including legibility, readability, cognitive complexity, constraints density, fall within acceptable bounds before the concept representation is used in a decision-making or market research activity.

According to another aspect, the present disclosure may enable sharing a visual representation of a product concept and its various elements with a user other than the owner (or author) of the visual representation of the product concept. In an embodiment, sharing a visual representation of a product concept may enable various aspects of collaboration and workflow management. For example, when a concept is shared with another person, a role may be specified and attendant permissions granted to the person with whom the visual representation is shared, relative to various aspects of the concept, including, for example, its representation, its elements and element variants and constraints. For example, roles may be assigned to one or more users, such as: Reviewer, Editor, and Manager, in addition to Owner. Privileges associated with the various roles may include, for example, reviewing and commenting on, editing, approving, locking the concept, its elements and their variants, the layout, constraints, and the like. The different roles may specify different permissions relative to one or more actions, including, for example: creating a new concept, editing, renaming, saving-as, sharing, changing permissions, transferring ownership, and deleting a concept and its various components. The permissions may also include locking a concept and its components and/or submitting the concept for fielding in a market research study.

According to another aspect, the present disclosure may enable uploading the results of various concept assessment processes, e.g., to make them available for use in subsequent decision-making or innovation activities. Such assessment results may include scoring or rating of different concept variations and/or element variants by internal and/or external stakeholders, such as personnel from Sales, Marketing, Engineering, Manufacturing, advertising agencies, importers, distributors, sales channels personnel, and so on. Results may also include market research findings, such as the results obtained from monadic concept tests and conjoint measurement.

According to yet another aspect, the present disclosure may enable searching for particular content within previously created visual representations of product concepts. For example, when creating new concepts, it may be useful to look at previously created concepts for inspiration, and/or to borrow elements and variants. It may also be useful to determine how certain elements have performed when tested with consumers or scored by stakeholders. In an embodiment, a search capability may be provided, which may display the results of the search based on relevance and incidence, and/or also based on assessment and testing performance. For example, a marketer using the disclosed method to develop a new product concept for a low calorie desert may want to search previous product concepts that contained the phrases "low calorie", "low fat", "diet", and the like, and see the results within the context in which they appeared (i.e., which concept and which element variant(s) within that concept), and determine how well they performed when tested with consumers in the past.

The above discussion of products and services, and of decision-making within an industrial and commercial context are provided for the purpose of example and illustration, and should not be construed as limiting any method and/or system of the present disclosure. It would be appreciated that any of the visual representations of product concepts herein may be used to represent any type of decision object, of which different versions are being considered. Examples of such decision objects may include, but are not limited to, a government health insurance plan, a public service campaign, a political candidate's positions and promises in an election campaign, an agenda for a sales meeting or a family reunion, an itinerary for a scout troop's excursion, to name a few. It is therefore intended that the present disclosure is amenable to use in such situations as well.

Additionally, while various embodiments and features have been described herein, it will be apparent to one having skill in the art that the various embodiments and features may be susceptible to combination with one another and/or to various additional/alternative combinations. All such combination of subject matter disclosed herein is intended to be contemplated by the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer implemented method comprising:
providing, with a processor, a framework to build a visual representation of a product concept, the visual representation including at least one of a textual component or a graphical component;
designating, with the processor, an element of the at least one of the textual component or the graphical component as a dynamic element;
associating, with the processor, the dynamic element with a variant list including a plurality of element variants;
determining lengths of text of the plurality of element variants;
selecting, with the processor, a subset of the plurality of element variants from the variant list to fit within the product concept, the selecting based on the determined lengths of the text of the plurality of element variants;
adjusting a formatting of the visual representation based on the subset selected; and
generating, with the processor, a first instantiation of the visual representation including the subset of the plurality of element variants as the dynamic element.

2. The computer implemented method of claim 1, wherein selecting the subset of the plurality of element variants includes receiving layout information associated with the plurality of element variants.

3. The computer implemented method of claim 2, wherein the layout information includes order information associated with the plurality of element variants.

4. The computer implemented method of claim 2, wherein the layout information includes presentation information associated with the plurality of element variants.

5. The computer implemented method of claim 4, wherein the presentation information includes position information associated with the plurality of element variants.

6. The computer implemented method of claim 1, wherein adjusting the formatting of the visual representation based on the subset selected includes adjusting the formatting of the visual representation based on at least one of an element variant having the longest length and an element variant having the shortest length.

7. A system comprising:
a memory including machine executable instructions, and a processor to execute the instructions to implement a framework for building a visual representation of a product concept, the visual representation including at least one of a textual component or a graphical component, the processor to implement the framework by:
designating an element of the at least one of the textual component or the graphical component as a dynamic element;
associating the dynamic element with a variant list including a plurality of element variants;
determining lengths of text of the plurality of element variants;
selecting a subset of the plurality of element variants from the variant list to fit within the product concept, the selection based on the determined lengths of the text of the plurality of element variants;
adjusting a formatting of the visual representation based on the subset selected; and
generating a first instantiation of the visual representation including the subset of the plurality of element variants as the dynamic element.

8. The system of claim 7, wherein the processor is to receive layout information associated with the plurality of element variants.

9. The system of claim 8, wherein the layout information includes order information associated with the plurality of element variants.

10. The system of claim 8, wherein the layout information includes presentation information associated with the plurality of element variants.

11. The system of claim 10, wherein the presentation information includes position information associated with the plurality of element variants.

12. An article of manufacture including instructions which, when executed by a processor, cause the processor to perform operations comprising:
providing a framework to build a visual representation of a product concept, the visual representation including at least one of a textual component or a graphical component;
designating an element of the at least one of the textual component or the graphical component as a dynamic element;
associating the dynamic element with a variant list including a plurality of element variants;
determining lengths of text of the plurality of element variants;
selecting a subset of the plurality of element variants from the variant list to fit within the product concept, the selecting based on the determined lengths of the text of the plurality of element variants;
adjusting a formatting of the visual representation based on the subset selected; and
generating a first instantiation of the visual representation including the subset of the plurality of element variants as the dynamic element.

13. The article of manufacture of claim 12, wherein selecting the subset of the plurality of element variants includes receiving layout information associated with the plurality of element variants.

14. The article of manufacture of claim 13, wherein the layout information includes order information associated with the plurality of element variants.

15. The article of manufacture of claim 13, wherein the layout information includes presentation information associated with the plurality of element variants.

16. The article of manufacture of claim 15, wherein the presentation information includes position information associated with the plurality of element variants.

17. The computer implemented method of claim 1, further including preventing interference between the plurality of element variants based on the lengths of the text.

18. The system of claim 7, wherein the processor is to prevent interference between the plurality of element variants based on the lengths of the text.

19. The article of manufacture of claim 12, wherein the instructions, when executed, cause the processor to prevent interference between the plurality of element variants based on the length of text.

* * * * *